(12) United States Patent
Ahn et al.

(10) Patent No.: US 12,710,908 B2
(45) Date of Patent: Aug. 18, 2026

(54) ELECTRONIC DEVICE AND METHOD FOR DISPLAYING SCREEN THROUGH PLURALITY OF DISPLAYS

(71) Applicant: Samsung Electronics Co., Ltd., Suwon-si (KR)

(72) Inventors: Donghyuk Ahn, Suwon-si (KR); Sanghun Kim, Suwon-si (KR); Jongwoon Jang, Suwon-si (KR); Bongseok Park, Suwon-si (KR); Jinhyun Kim, Suwon-si (KR); Taehoon Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 19/046,055

(22) Filed: Feb. 5, 2025

(65) Prior Publication Data

US 2025/0181298 A1 Jun. 5, 2025

Related U.S. Application Data

(63) Continuation of application No. PCT/KR2023/008719, filed on Jun. 22, 2023.

(30) Foreign Application Priority Data

Aug. 9, 2022 (KR) ........................ 10-2022-0099521

(51) Int. Cl.
*G06F 3/14* (2006.01)
*G06F 1/16* (2006.01)

(52) U.S. Cl.
CPC .......... *G06F 3/1423* (2013.01); *G06F 1/1652* (2013.01); *G06F 1/1686* (2013.01)

(58) Field of Classification Search
CPC ..... G06F 1/1686; G06F 1/1652; G06F 3/1423
See application file for complete search history.

(56) References Cited

U.S. PATENT DOCUMENTS 10,542,128 B2 1/2020 Kang et al.
11,016,531 B2 5/2021 Kim et al.
(Continued)

FOREIGN PATENT DOCUMENTS

CN 111263005 A 6/2020
EP 3 779 643 A1 2/2021
(Continued)

OTHER PUBLICATIONS

International Search Report and written opinion dated Oct. 12, 2023, issued in International Application No. PCT/KR2023/008719.

(Continued)

*Primary Examiner* — Nitin Patel
(74) *Attorney, Agent, or Firm* — Jefferson IP Law, LLP

(57) ABSTRACT

An electronic device is provided. The electronic device includes a first housing, a second housing, a hinge structure rotatably connecting the first housing to the second housing based on a folding axis, a first display, which is foldable and includes a first display area corresponding to a surface of the first housing and a second display area corresponding to a surface of the second housing, wherein the first display area and the second display area are divided with based on the folding axis according to the hinge structure, a second display in the first housing, the second display including a third display area opposite to the first display area, a first camera disposed on another surface of the second housing opposite to the second display area, at least one sensor, memory storing one or more computer programs, and one or more processors communicatively coupled to the first display, the second display, and the memory, wherein the one (Continued)

or more computer programs include computer-executable instructions that, when executed by the one or more processors individually or collectively, cause the electronic device to display, through the second display among the first display and the second display a preview image obtained using the first camera in an unfolding state that a first direction toward which the first display area faces corresponds to a second direction toward which the second display area faces, receive a first user input while the preview image is displayed through the second display, and in response to the first user input, display the preview image through the first display among the first display and the second display.

20 Claims, 16 Drawing Sheets

(56) References Cited

U.S. PATENT DOCUMENTS

| | | | | |
|---|---|---|---|---|
| 11,029,907 | B2 | 6/2021 | Myung et al. | |
| 11,829,599 | B2 | 11/2023 | Chen et al. | |
| 11,966,659 | B2 * | 4/2024 | Agrawal | G06F 1/1649 |
| 2020/0356140 | A1 | 11/2020 | Kim et al. | |
| 2020/0389578 | A1 * | 12/2020 | Lee | H04M 1/0268 |
| 2021/0208831 | A1 * | 7/2021 | Zhang | H04N 23/633 |
| 2021/0389873 | A1 | 12/2021 | Chen et al. | |
| 2022/0150345 | A1 | 5/2022 | Woo et al. | |
| 2022/0303476 | A1 | 9/2022 | Jang et al. | |
| 2022/0317847 | A1 | 10/2022 | Kim et al. | |
| 2023/0044497 | A1 | 2/2023 | Zhang et al. | |
| 2023/0144615 | A1 | 5/2023 | Kim et al. | |
| 2023/0224573 | A1 | 7/2023 | Park et al. | |
| 2024/0357228 | A1 * | 10/2024 | Wang | G06F 1/1652 |
| 2025/0383895 | A1 * | 12/2025 | Liu | G06F 3/04845 |
| 2026/0016861 | A1 * | 1/2026 | Yi | G06F 1/1677 |

FOREIGN PATENT DOCUMENTS

| | | | |
|---|---|---|---|
| KR | 10-2020-0129584 | A | 11/2020 |
| KR | 10-2203506 | B1 | 1/2021 |
| KR | 10-2021-0017282 | A | 2/2021 |
| KR | 10-2021-0089377 | A | 7/2021 |
| KR | 10-2022-0008753 | A | 1/2022 |
| KR | 10-2022-0058202 | A | 5/2022 |
| KR | 10-2022-0058543 | A | 5/2022 |
| KR | 10-2576844 | B1 | 9/2023 |
| KR | 10-2660947 | B1 | 4/2024 |

OTHER PUBLICATIONS

Extended European Search Report dated Sep. 30, 2025, issued in European Application No. 23852725.3-1218.

* cited by examiner

FIG. 14

ELECTRONIC DEVICE AND METHOD FOR DISPLAYING SCREEN THROUGH PLURALITY OF DISPLAYS

CROSS-REFERENCE TO RELATED APPLICATION(S)

This application is a continuation application, claiming priority under 35 U.S.C. § 365(c), of an International application No. PCT/KR2023/008719, filed on Jun. 22, 2023, which is based on and claims the benefit of a Korean patent application number 10-2022-0099521, filed on Aug. 9, 2022, in the Korean Intellectual Property Office, the disclosure of which is incorporated by reference herein in its entirety.

BACKGROUND

1. Field

The disclosure relates to an electronic device and a method for displaying a screen through a plurality of displays.

2. Description of Related Art

With development of technology, an electronic device including a plurality of displays has been developed. For example, a first display among the plurality of displays included in the electronic device may be foldable. The electronic device may display a screen divided based on a folding axis by using the first display.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device and a method for displaying a screen through a plurality of displays.

Additional aspects will be set forth in part in the description which follows and, in part, will be apparent from the description, or may be learned by practice of the presented embodiments.

In accordance with an aspect of the disclosure, an electronic device is provided. The electronic device includes a first housing, a second housing, a hinge structure rotatably connecting the first housing to the second housing based on a folding axis, a first display, which is foldable, including a first display area corresponding to a surface of the first housing and a second display area corresponding to a surface of the second housing, wherein the first display area and the second display area are divided based on the folding axis according to the hinge structure, a second display in the first housing, including a third display area opposite to the first display area, a first camera disposed on another surface of the second housing opposite to the second display area, at least one sensor, memory storing one or more computer programs and one or more processors communicatively coupled to the first display, the second display, and the memory, wherein the one or more computer programs include computer-executable instructions that, when executed by the one or more processors individually or collectively, cause the electronic device to display, through the second display among the first display and the second display, a preview image obtained using the first camera in an unfolding state that a first direction toward which the first display area faces corresponds to a second direction toward which the second display area faces, receive a first user input while the preview image is displayed through the second display, and, in response to the first user input, display the preview image through the first display among the first display and the second display.

In accordance with another aspect of the disclosure, a method of an electronic device is provided. The method includes, in an unfolding state that a first direction toward which a first display area of a first display among the first display and a second display faces corresponds to a second direction toward which a second display area of the first display faces, displaying, through the second display among the first display and the second display included in the electronic device, a preview image obtained using a first camera of the electronic device, receiving a first user input indicating a predetermined gesture while the preview image is displayed through the second display, and, in response to the first user input, displaying the preview image through the first display among the first display and the second display.

In accordance with yet another aspect of the disclosure, One or more non-transitory computer-readable storage media storing one or more computer programs including computer-executable instructions that, when executed by one or more processors of an electronic device individually or collectively, cause the electronic device to perform operations is provided. The operations include in an unfolding state that a first direction toward which a first display area of a first display among the first display and a second display faces corresponds to a second direction toward which a second display area of the first display faces, displaying, through the second display among the first display and the second display comprised in the electronic device, a preview image obtained using a first camera of the electronic device, receiving a first user input indicating a predetermined gesture while the preview image is displayed through the second display, and, in response to the first user input, displaying the preview image through the first display among the first display and the second display.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 14 illustrates an example of an operation of an electronic device according to an embodiment of the disclosure.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It should be appreciated that the blocks in each flowchart and combinations of the flowcharts may be performed by one or more computer programs which include instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g. a central processing unit (CPU)), a communication processor (CP, e.g., a modem), a graphics processing unit (GPU), a neural processing unit (NPU) (e.g., an artificial intelligence (AI) chip), a Wi-Fi chip, a Bluetooth® chip, a global positioning system (GPS) chip, a near field communication (NFC) chip, connectivity chips, a sensor controller, a touch controller, a finger-print sensor controller, a display driver integrated circuit (IC), an audio CODEC chip, a universal serial bus (USB) controller, a camera controller, an image processing IC, a microprocessor unit (MPU), a system on chip (SoC), an IC, or the like.

Figure 1:
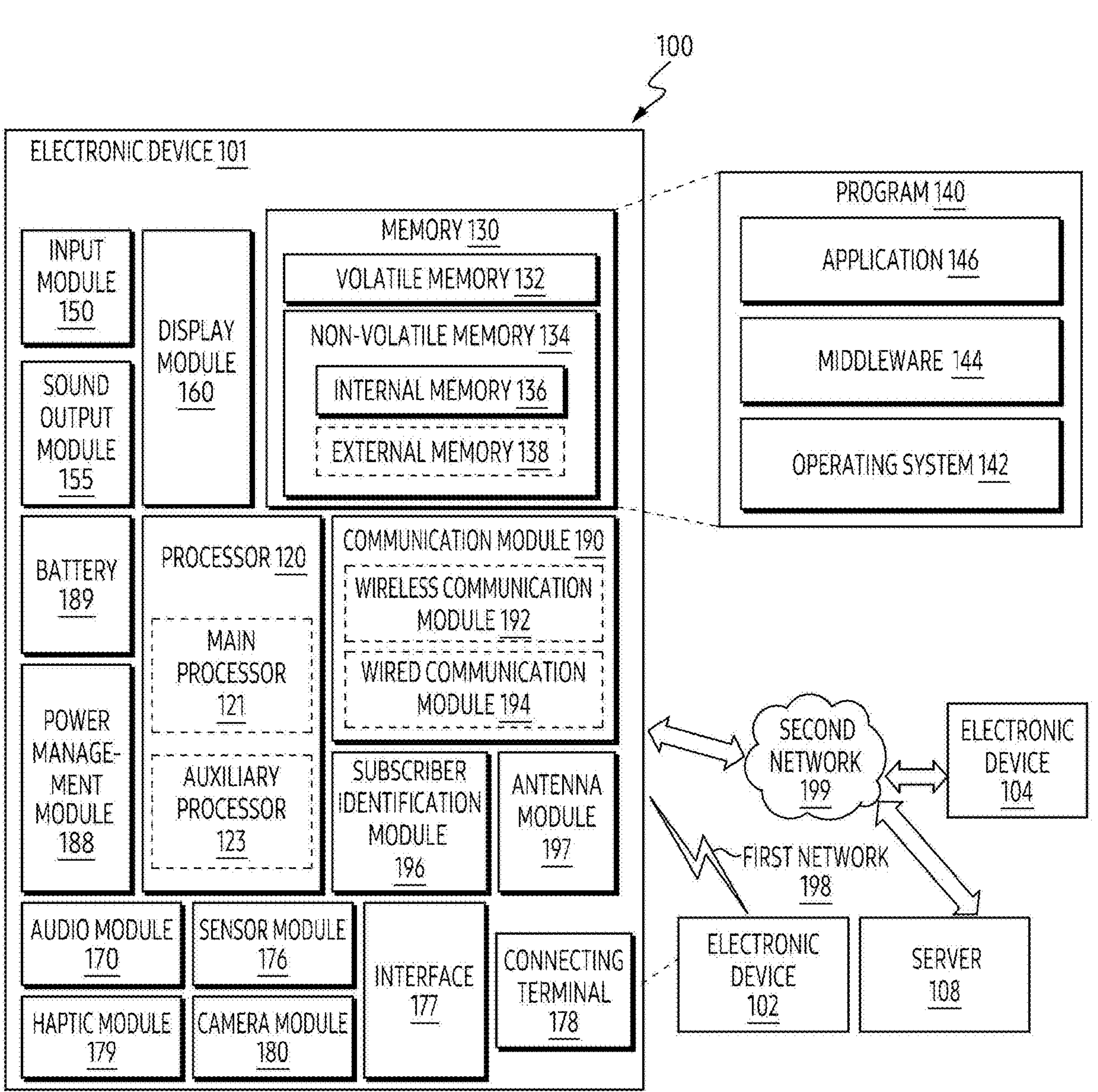
FIG. 1 is a block diagram of an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
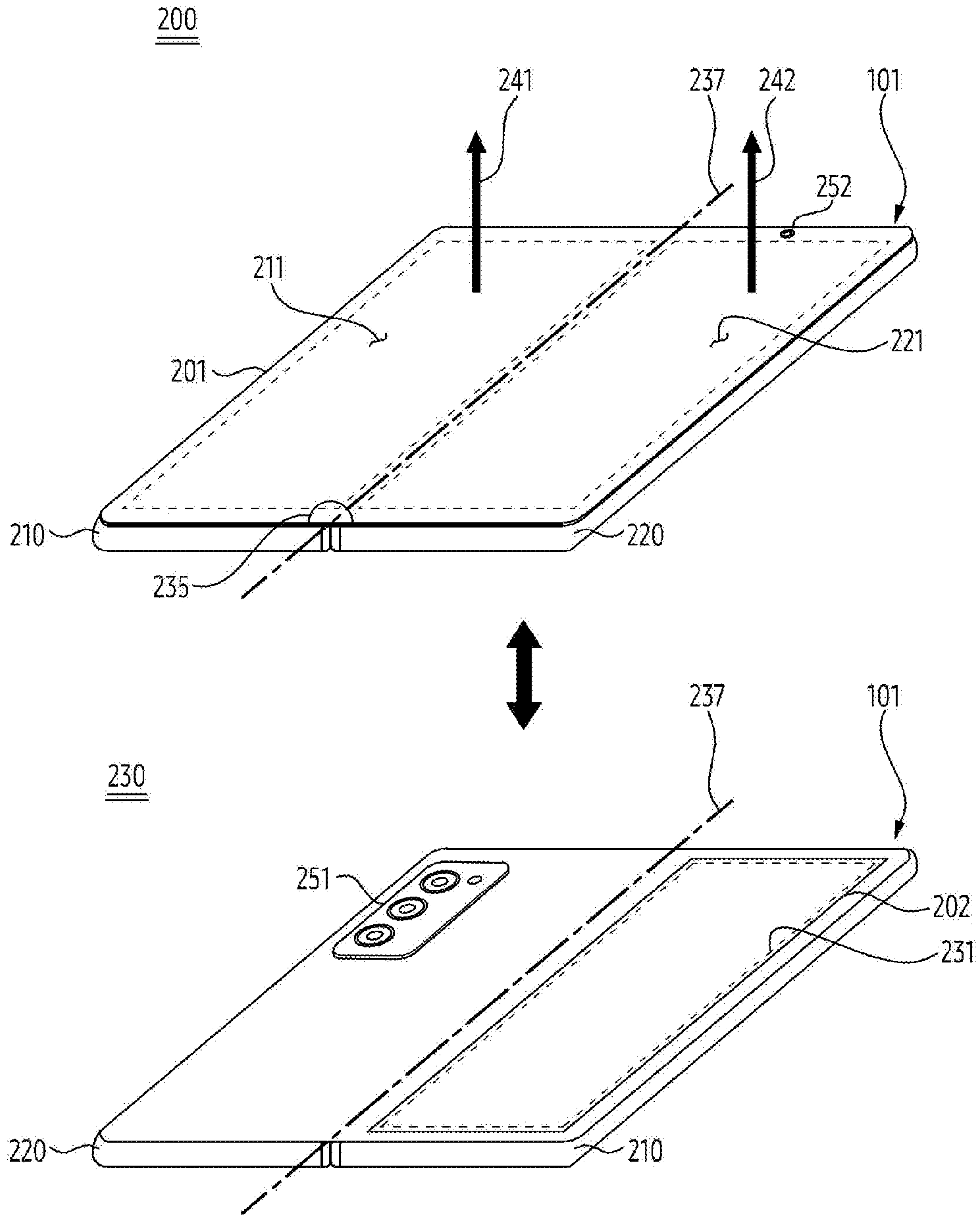
FIG. 2A illustrates an example of a positional relationship between a first housing and a second housing in an unfolding state of an electronic device according to an embodiment of the disclosure.

FIG. 2A illustrates an example of a top view and a bottom view of an electronic device in an unfolding state of the electronic device according to an embodiment of the disclosure.

Figure 2B:
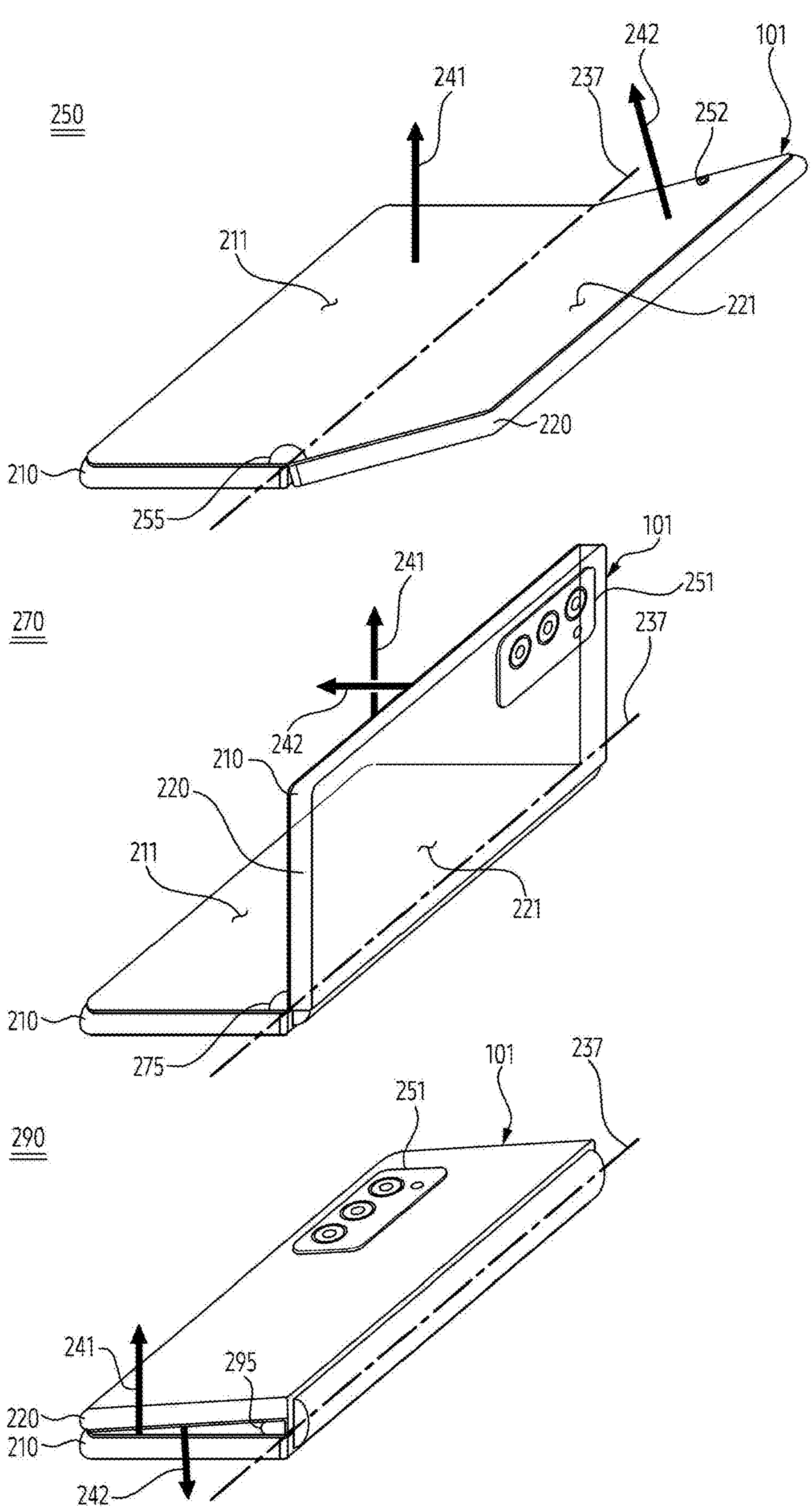
FIG. 2B illustrates an example of positional relationships between a first housing and a second housing in a folding state of an electronic device according to an embodiment of the disclosure.

FIG. 2B illustrates an example of positional relationships between a first housing and a second housing in a folding state of an electronic device according to an embodiment of the disclosure.

Referring to FIGS. 2A and 2B, a state 200 indicates a top view of an electronic device 101 in an unfolding state of the electronic device 101. A state 230 illustrates a bottom view of the electronic device 101 in the unfolding state.

The electronic device 101 may include a first housing 210 and a second housing 220. The electronic device 101 may be folded so that the first housing 210 and the second housing 220 are stacked or overlapped with each other. The electronic device 101 may include a hinge structure for configuring the first housing 210 and the second housing 220 to be folded based on a folding axis 237. For example, the folding axis 237 may mean a reference for folding the electronic device 101.

According to an embodiment, a first display 201 of the electronic device 101 may be configured as a flexible display. The first display 201 of the electronic device 101 may be folded based on the folding axis 237. For example, the first display 201 may include a first display area 211 and a second display area 221. The second display area 221 may be adjacent to the first display area 211 along the folding axis 237. For example, a display area of the first display 201 may be divided into the first display area 211 and the second display area 221 based on the folding axis 237.

According to an embodiment, the electronic device 101 may include a first camera 251 and/or a second camera 252. For example, the first camera 251 may be disposed on another surface of the second housing 220, opposite to the second display area 221 corresponding to a surface of the second housing 220. The second camera 252 may be disposed on a surface of an electronic device 400 corresponding to the first display area 211 and the second display area 221. For example, the second camera 252 may be disposed to face a direction toward which a first display 421 faces. As an example, the second camera 252 may be disposed on a surface of the second housing 220 corresponding to the second display area 221. For example, each of the first camera 251 and the second camera 252 may be configured with at least one camera.

Referring to the state 230, the electronic device 101 may include a second display 202 for providing a third display area 231 opposite to the first display area 211 in the first housing 210.

According to an embodiment, the electronic device 101 may be in the unfolding state. For example, the electronic device 101 may provide the unfolding state in which the first housing 210 and the second housing 220 are fully folded out. In an embodiment, the unfolding state may be referred to as an outspread state (or outspreading state).

According to an embodiment, the unfolding state may include a state that a first direction 241 toward which the first display area 211 faces corresponds to a second direction 242 toward which the second display area 221 faces. For example, the first direction 241 may be parallel to the second direction 242. For example, the first direction 241 may correspond to the second direction 242.

According to an embodiment, in the unfolding state, the first display area 211 and the second display area 221 may form substantially one plane. For example, an angle 235 between the first display area 211 and the second display area 221 may be 180 degrees.

Referring to FIG. 2B, the electronic device 101 may provide a folding state in which the first housing 210 and the second housing 220 are folded in. For example, the electronic device 101 may be in the folding state including a state 250, a state 270, and a state 290. In an embodiment, the folding state may be referred to as a folded state.

According to an embodiment, the folding state including the state 250, the state 270, and the state 290 may mean a state that the first direction 241 toward which the first display area 211 faces is distinguished from the second direction 242 toward which the second display area 221 faces. For example, an angle between the first direction 241 and the second direction 242 may be greater than 0 degree and less than or equal to 180 degrees. For example, an angle between the first display area 211 and the second display area 221 may be greater than 0 degree and less than or equal to 180 degrees.

For example, in the state 250, the angle between the first direction 241 and the second direction 242 may be 45 degrees. In the state 250, an angle 255 between the first display area 211 and the second display area 221 may be 135 degrees.

For example, in the state 270, the angle between the first direction 241 and the second direction 242 may be 90 degrees. In the state 270, an angle 275 between the first display area 211 and the second display area 221 may be 90 degrees.

For example, in the state 290, the angle between the first direction 241 and the second direction 242 may be 180 degrees. In the state 290, an angle 295 between the first display area 211 and the second display area 221 may be 0 degree.

Figure 3:
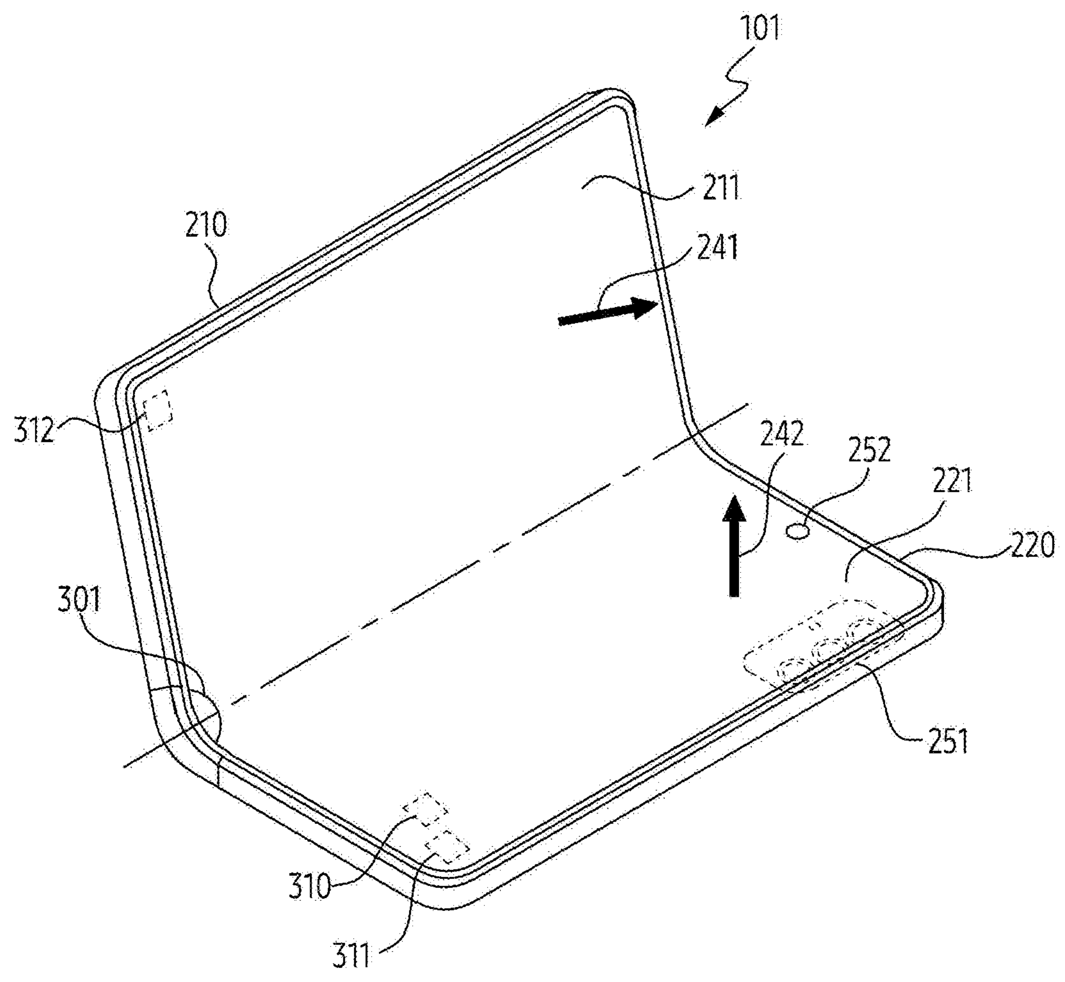
FIG. 3 illustrates an example of a plurality of states of an electronic device according to an embodiment of the disclosure.

FIG. 3 illustrates an example of a plurality of states of an electronic device according to an embodiment of the disclosure.

Referring to FIG. 3, an electronic device 101 may provide the plurality of states based on a positional relationship between a first housing 210 and a second housing 220. For example, the electronic device 101 may provide the plurality of states based on an angle 301 between a first display area 211 and a second display area 221. For example, the electronic device 101 may provide the plurality of states based on an angle between a first direction 241 toward which the first display area 211 faces and a second direction 242 toward which the second display area 221 faces.

According to an embodiment, the electronic device 101 may identify the angle 301 between the first display area 211 and the second display area 221. For example, the electronic device 101 may include a hall sensor 310 for identifying the angle 301. The electronic device 101 may include at least one magnet. The hall sensor 310 included in the electronic device 101 may obtain data on a magnetic field generated by at least one magnet. The electronic device 101 may identify the angle 301 between the first display area 211 and the second display area 221 based on the data on the magnetic field obtained by using the hall sensor 310.

According to an embodiment, the hall sensor 310 may be disposed in the second housing 220. A first magnet 311 may be disposed in the second housing 220. A second magnet 312 may be disposed at a position corresponding to a position of the first magnet 311 in the first housing 210. For example, the first magnet 311 may be disposed along one of peripheries of the second housing 220. The second magnet 312 may be disposed at a position corresponding to the position of the first magnet 311 along one of peripheries of the first housing 210. For example, the first magnet 311 may be disposed in one of edge regions of the second housing 220. The second magnet 312 may be disposed to correspond to the position of the first magnet 311 in one of edge regions of the first housing 210. FIG. 3 illustrates an example in which the hall sensor 310, the first magnet 311, and the second magnet 312 are disposed in the electronic device 101, but is not limited thereto. The hall sensor 310, the first magnet 311, and the second magnet 312 may be variously disposed to identify the angle 301 (or an angle between the first direction 241 and the second direction 242) between the first display area 211 and the second display area 221.

According to an embodiment, the electronic device 101 may provide the plurality of states based on the positional relationship between the first housing 210 and the second housing 220. For example, the electronic device 101 may provide the plurality of states based on the angle 301 between the first display area 211 and the second display area 221. For example, the electronic device 101 may provide the plurality of states based on the angle between the first direction 241 toward which the first display area 211 faces and the second direction 242 toward which the second display area 221 faces.

According to an embodiment, the electronic device 101 may provide the plurality of states including a first state to a third state based on the positional relationship between the first housing 210 and the second housing 220.

For example, the electronic device 101 may provide the first state in which the first direction 241 toward which the first display area 211 faces and the second direction 242 toward which the second display area 221 faces are opposite. For example, the electronic device 101 may provide a second state in which the second direction 242 corresponds to the first direction 241. For example, the electronic device 101 may provide the third state in which the angle 301 between the first direction 241 toward which the first display area 211 faces and the second direction 242 toward which the second display area 221 faces is within a reference range.

For example, the electronic device 101 in the first state may operate in a state in which a first display 201 is fully folded. The electronic device 101 in the first state may provide a screen by using a third display area 231 of a second display 202. Hereinafter, the first state may be referred to as a folding state.

For example, the electronic device 101 in the second state may provide a screen in which the first display area 211 and the second display area 221 of the first display 201 are not divided. Hereinafter, the second state may be referred to as an unfolding state.

For example, the electronic device 101 in the third state may provide a screen in which the first display area 211 and the second display area 221 of the first display 201 are divided.

According to an embodiment, in the first state, the electronic device 101 may display a preview image through the third display area 231 of the second display 202 by using a first camera 251. In the first state, while the preview image is displayed through the third display area 231, the electronic device 101 may not be able to display the preview image by using the first display 201.

For example, after setting a main display to the second display 202 based on execution of a framework (e.g., a user interface (UI) framework), a processor of the electronic device may display the preview image by using the second display 202. In order to display the preview image on the first display 201, the first display should be set as the main display. For example, in case that the state of the electronic device changes from the unfolding state to the folding state again, the main display may be set to the first display 201. For example, in case that a mode of the electronic device 101 is changed from a standby mode to an operation mode, the main display may be set to the first display 201.

In the following specification, while the preview image is displayed through the second display 202, in the first state, an embodiment for displaying the preview image by using the first display 201 may be described.

Figure 4:
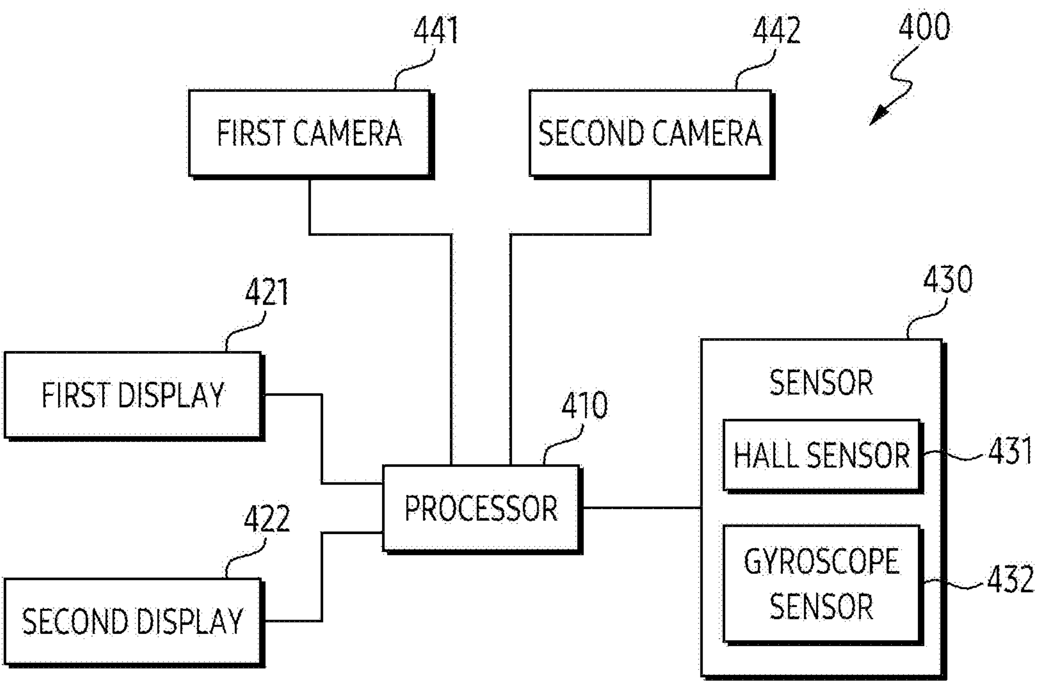
FIG. 4 is a simplified block diagram of an electronic device according to an embodiment of the disclosure.

FIG. 4 is a simplified block diagram of an electronic device according to an embodiment of the disclosure.

Referring to FIG. 4, an electronic device 400 may include some or all of components of the electronic device 101 illustrated in FIG. 1. For example, the electronic device 400 may correspond to the electronic device 101 illustrated in FIG. 1, 2A, 2B, or 3.

According to an embodiment, the electronic device 400 may include a processor 410, a first display 421, a second display 422, a sensor 430, a first camera 441, and/or a second camera 442. According to an embodiment, the electronic device 400 may include at least one of the processor 410, the first display 421, the second display 422, the sensor 430, the first camera 441, and the second camera 442. For example, at least a portion of the processor 410, the first display 421, the second display 422, the sensor 430, the first camera 441, and the second camera 442 may be omitted according to an embodiment.

According to an embodiment, the processor 410 may be operatively (or operably) coupled with or connected with the first display 421, the second display 422, the sensor 430, the first camera 441, and the second camera 442. The processor 410 being operatively (or operably) coupled with or connected with the first display 421, the second display 422, the sensor 430, the first camera 441, and the second camera 442 may mean that the processor 410 may control the first display 421, the second display 422, the sensor 430, the first camera 441, and the second camera 442.

For example, the processor 410 may control the first display 421, the second display 422, the sensor 430, the first camera 441, and the second camera 442. The first display 421, the second display 422, the sensor 430, the first camera 441, and the second camera 442 may be controlled by the processor 410. For example, the processor 410 may be configured with at least one processor. The processor 410 may include the at least one processor. For example, the processor 410 may correspond to the processor 120 of FIG. 1.

According to an embodiment, the processor 410 may include a hardware component for processing data based on one or more instructions. The hardware components for processing data may include, for example, an arithmetic and logic unit (ALU), a field programmable gate array (FPGA), and/or a central processing unit (CPU).

According to an embodiment, the electronic device 400 may include the first display 421. For example, the first display 421 may be a flexible display. For example, the first display 421 may be folded along a folding axis (e.g., the folding axis 237 of FIG. 2A). The electronic device 400 may include a first housing (e.g., the first housing 210 of FIGS. 2A, 2B, and 3) and a second housing (e.g., the second housing 220 of FIGS. 2A, 2B and 3). The electronic device 400 may be folded so that the first housing and the second housing overlap or superimpose each other. The electronic device 400 may be folded based on the folding axis. The first display 421 may be folded along the folding axis based on the electronic device 400 being folded with respect to the folding axis. For example, the first display 421 may correspond to the display module 160 of FIG. 1. For example, the first display 421 may correspond to the first display 201 of FIGS. 2A, 2B, and 3.

According to an embodiment, the first display 421 may include (or provide) a first display area and a second display area. The first display area may correspond to a surface of the first housing. The second display area may correspond to a surface of the second housing. The second display area may be adjacent to the first display area along the folding axis.

For example, the first housing may correspond to the first housing 210 of FIG. 2A, 2B, or 3. The second housing may correspond to the second housing 220 of FIG. 2A, 2B, or 3. For example, the first display area may correspond to the first display area 211 of FIGS. 2A, 2B, and 3. The second display area may correspond to the second display area 221 of FIGS. 2A, 2B, and 3.

For example, while a first direction toward which the first display area faces and a second direction toward which the second display area faces are opposite, the electronic device 400 may provide a first state. In the first state, the processor 410 may deactivate the first display 421.

For example, while the second direction toward which the second display area faces corresponds to the first direction toward which the first display area faces, the electronic device 400 may provide a second state. In the second state, the processor 410 may provide a screen in which the first display area and the second display area are not divided by using the first display 421.

For example, while an angle between the first direction toward which the first display area faces and the second direction toward which the second display area faces is in a second reference range, the electronic device 400 may provide a third state. In the third state, the processor 410 may provide a screen in which the first display area and the second display area are divided by using the first display 421.

According to an embodiment, the electronic device 400 may include the second display 422. For example, the second display 422 may be included in the first housing (e.g., the first housing 210 of FIGS. 2A, 2B, and 3). For example, the second display 422 may be disposed to face the first display 421 in the first housing. For example, the second display 422 may include the third display area. The third display area may be opposite to the first display area of the first display 421. The third display area may be opposite the first display area of the first display 421.

According to an embodiment, the electronic device 400 may include the sensor 430. The sensor 430 may be used to obtain various information. For example, the sensor 430 may be used to obtain information on the electronic device 400. For example, the sensor 430 may be configured with at least one sensor. The sensor 430 may include at least one sensor. For example, the sensor 430 may correspond to the sensor module 176 of FIG. 1.

For example, the sensor 430 may include a hall sensor 431 (e.g., the hall sensor 310 of FIG. 3). The hall sensor 431 may be used to identify a positional relationship between the first housing and the second housing of the electronic device 400. The hall sensor 431 may be used to identify an angle between the first display area and the second display area. The hall sensor 431 may be used to identify an angle between the first direction toward which the first display area faces and the second direction toward which the second display area faces.

For example, the sensor 430 may include a gyroscope sensor 432. The gyroscope sensor 432 may identify (or measure or detect) angular velocity of the electronic device 400 in three directions of an x-axis, a y-axis, and a z-axis.

According to an embodiment, the processor 410 may identify a posture (or an orientation) of the electronic device 400 by using the gyroscope sensor 432. The processor 410 may identify the posture of the electronic device 400 as one of a first posture and a second posture by using the gyroscope sensor 432. For example, the first posture may mean a posture in which the first camera 441 faces a user of the electronic device 400. For example, the second posture may mean a posture in which the second camera 442 faces the user of the electronic device 400.

According to an embodiment, the sensor 430 may further include various sensors for obtaining information on the electronic device 400 as well as the hall sensor 431 and the gyroscope sensor 432. For example, the sensor 430 may include an acceleration sensor. The acceleration sensor may identify (or measure or detect) acceleration of the electronic device 400 in the three directions of the x-axis, the y-axis, and the z-axis. For example, the sensor 430 may further include a grip sensor. The grip sensor may be used to identify whether the electronic device 400 is gripped. The grip sensor may identify (or obtain) a change value in capacitance generated by proximity of dielectric (or a part of a body of a user) to the electronic device 400.

Figure 5:
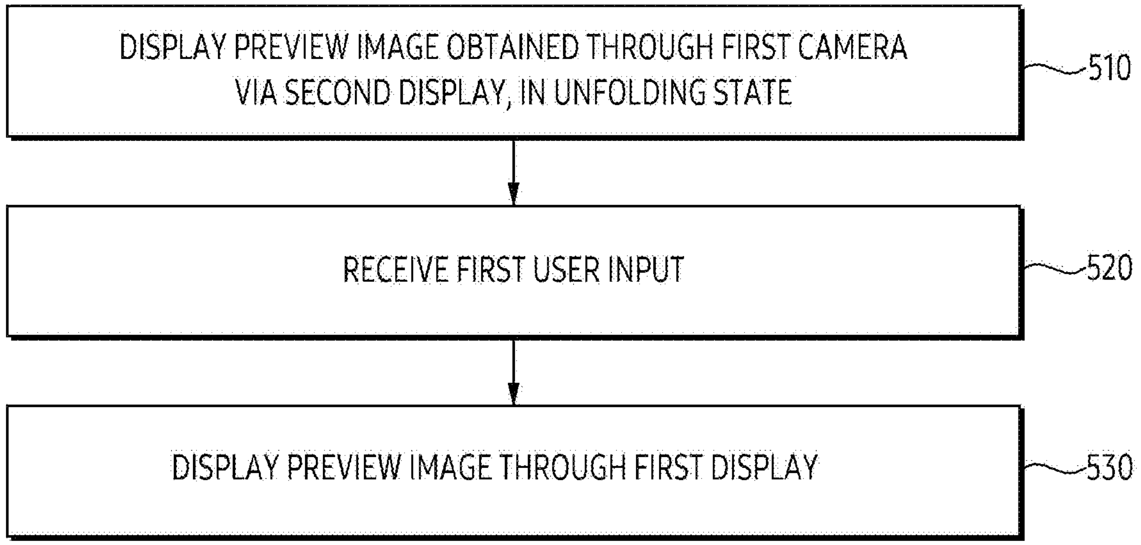
FIG. 5 illustrates a flowchart related to an operation of an electronic device according to an embodiment of the disclosure.

FIG. 5 illustrates a flowchart related to an operation of an electronic device according to an embodiment of the disclosure.

Referring to FIG. 5, in an operation 510, a processor 410 may display a preview image obtained through a first camera 441 via a second display 422, in an unfolding state. For example, the processor 410 may display the preview image obtained through the first camera 441 via the second display 422 among a first display 421 and the second display 422 in the unfolding state in which a first direction toward which a first display area faces and a second direction toward which a second display area faced are the same.

According to an embodiment, the processor 410 may operate in the unfolding state. The processor 410 may identify an angle between the first direction toward which the first display area faces and the second direction toward which the second display area faces, by using a hall sensor 431. For example, the processor 410 may identify that the angle between the first direction and the second direction is 0 degree. For example, the processor 410 may identify that the first direction corresponds to the second direction using the hall sensor 431. For example, the processor 410 may identify that the first direction and the second direction are the same by using the hall sensor 431.

According to an embodiment, the processor 410 may obtain the preview image through the first camera 441. The processor 410 may display the preview image obtained through the first camera 441 via the second display 422. For example, the processor 410 may display the preview image obtained through the first camera 441 in a first user interface set in a third display area of the second display 422. The preview image displayed through the second display 422 may be included in the first user interface set in the third display area.

According to an embodiment, the processor 410 may identify a posture of an electronic device 400 as a first posture. The processor 410 may identify that the posture of the electronic device 400 is the first posture toward which the first camera 441 faces a user of the electronic device 400. For example, the processor 410 may display the preview image obtained through the first camera 441 in the first posture via the second display 422. For example, the preview image obtained through the first camera 441 may include an object related to a part of a body of the user (e.g., a face of the user) of the electronic device 400.

In an operation 520, the processor 410 may receive a first user input. For example, the processor 410 may receive the first user input while the preview image is displayed through the second display 422.

According to an embodiment, while the preview image is displayed through the second display 422, the processor 410 may display a visual affordance for receiving the first user input through the first display 421.

For example, the visual affordance may include information indicating that the preview image is displayed on the second display 422, and a visual object for receiving the first user input. The processor 410 may receive (or identify) the first user input for a visual object included in the visual affordance. The processor 410 may identify at least one touch input for the visual object as the first user input. The at least one touch input for the visual object may be set to one of a swipe input, a tap input, a double tap input, a long press input, and a drag input.

For example, the visual affordance may include information for guiding an input to one of a plurality of buttons of the electronic device 400. The processor 410 may identify the input to one of the plurality of buttons as the first user input.

For example, the visual affordance may include information indicating that a display on which the preview image is displayed may be changed from the second display 422 to the first display 421 based on data identified through a sensor 430 (or at least one sensor). The processor 410 may receive (or identify) the first user input based on the data identified through the sensor 430.

In an operation 530, the processor 410 may display the preview image through the first display 421. For example, the processor 410 may, in response to the first user input, display the preview image through the first display 421 among the first display 421 and the second display 422.

According to an embodiment, the processor 410 may receive (or identify) the first user input according to the visual affordance displayed on the first display 421. In response to receiving (or identifying) the first user input according to the visual affordance displayed on the first display 421, the processor 410 may display the preview image on the first display 421 among the first display 421 and the second display 422.

According to an embodiment, the processor 410 may, in response to the first user input, cease displaying the visual affordance. For example, the processor 410 may, in response to the first user input, cease displaying the visual affordance displayed on the first display 421 and display the preview image on the first display 421.

According to an embodiment, the processor 410 may, in response to the first user input, cease displaying the preview image. The processor 410 may, in response to the first user input, not display the preview image on the second display 422. The processor 410 may, in response to the first user input, change the second display 422 from an active state to an inactive state. In response to the first user input, the processor 410 may change the preview image to a basic screen on the second display 422. For example, the processor 410 may change the preview image displayed on the second display 422 to the basic screen (e.g., a black screen or a screen provided according to an always on display (AOD) function) displayed in a power saving state.

According to an embodiment, the processor 410 may, in response to the first user input, switch (or change) a display for providing a main screen from the second display 422 to the first display 421. The processor 410 may, in response to the first user input, switch (or change) a display for providing an auxiliary screen from the first display 421 to the second display 422.

According to an embodiment, the processor 410 may display a second user interface through the second display 422. For example, the second user interface may be displayed in the first display area and the second display area. The second user interface may include the preview image obtained by using the first camera 441.

According to an embodiment, the processor 410 may change a camera for displaying the preview image from the first camera 441 to the second camera 442 based on an input to an element included in the second user interface. The processor 410 may deactivate the first camera 441 in response to the input to the element. The processor 410 may activate the second camera 442 in response to the input to the element. The processor 410 may display another preview image obtained by using the second camera 442 using the first display 421.

Figure 6:
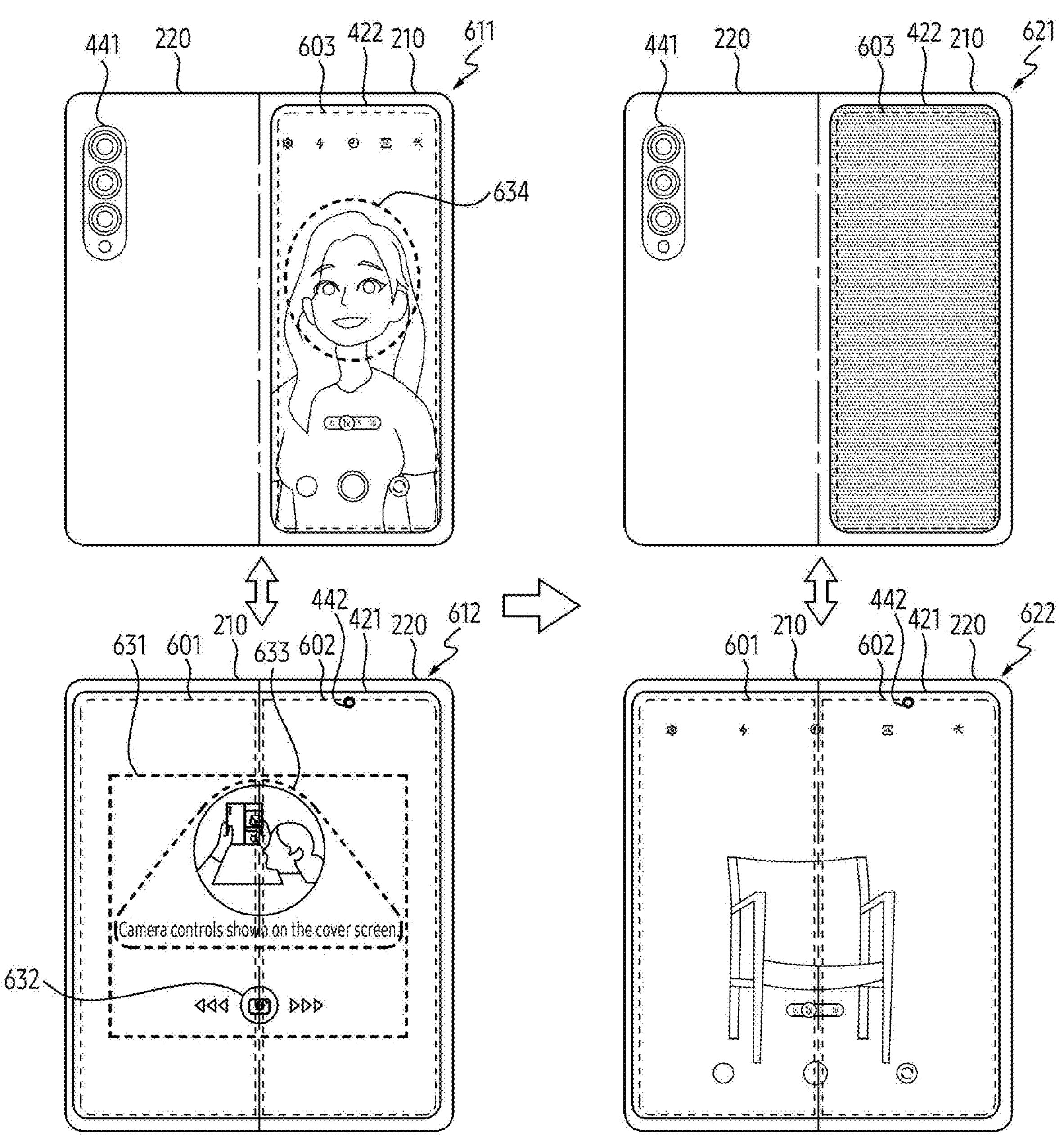
FIG. 6 illustrates an example of an operation of an electronic device according to an embodiment of the disclosure.

FIG. 6 illustrates an example of an operation of an electronic device according to an embodiment of the disclosure.

Referring to FIG. 6, an electronic device 400 may include a first housing 210, a second housing 220, a hinge structure (not illustrated) rotatably connecting the first housing 210 to the second housing 220 based on a folding axis, a first display 421, a second display 422, a first camera 441, and a second camera 442. For example, the first display 421 may be foldable based on the folding axis. The first display 421 may be divided into a first display area 601 and a second display area 602 based on the folding axis. The first display area 601 may correspond to a surface of the first housing 210. The second display area 602 may correspond to a surface of the second housing 220.

In states 611, 612, 621, and 622, the electronic device 400 may operate in an unfolding state in which a first direction toward which the first display area 601 faces corresponds to a second direction toward which the second display area 602 faces.

The state 611 and the state 612 indicate an example of the operation of the electronic device 400 at a first time point. The state 611 illustrates a top view of the electronic device 400 at the first time point. The state 612 illustrates a bottom view of the electronic device 400 at the first time point.

The state 621 and the state 622 illustrate an example of the operation of the electronic device 400 at a second time point. The state 621 illustrates a top view of the electronic device 400 at the second time point. The state 622 illustrates a bottom view of the electronic device 400 at the second time point.

In the state 611, a processor 410 may display a preview image obtained by using the first camera 441 through the second display 422. The processor 410 may display the preview image obtained by using the first camera 441 in a third display area 603 of the second display 422.

According to an embodiment, in order to photograph a part of a body of a user (e.g., a face of the user) by using the first camera 441, the user of the electronic device 400 may use the electronic device 400 in a state in which the preview image obtained by using the first camera 441 is displayed on the second display 422. For example, a posture of the electronic device 400 may be a first posture in which the first camera 441 faces the user. The processor 410 may display the preview image obtained by using the first camera 441 while the posture of the electronic device 400 is the first posture. While the posture of the electronic device 400 is the first posture, the preview image obtained by using the first camera 441 may include an object 634 related to the part of the body of the user.

In the state 612, while the preview image obtained by using the first camera 441 is displayed in the third display area 603 of the second display 422, the processor 410 may display a visual affordance 631 in the first display area 601 and the second display area 602 of the first display 421. For example, the visual affordance 631 may include information indicating that a preview image is displayed on the second display 422, and a visual object 632 for receiving a first user input. The information indicating that the preview image is displayed on the second display may be displayed in an area 633.

According to an embodiment, the processor 410 may receive (or identify) a first user input for the visual object 632. The processor 410 may receive (or identify) at least one touch input for the visual object 632. The processor 410 may identify the at least one touch input for the visual object 632 as the first user input. For example, the processor 410 may identify (or determine) whether to switch (or change) a display on which the preview image is displayed from the second display 422 to the first display 421 based on whether the first user input is received.

In the state 621, the processor 410 may, in response to the first user input, cease displaying the preview image on the second display 422. For example, the processor 410 may, in response to the first user input, change the second display 422 from an active state to an inactive state. For example, the processor 410 may, in response to the first user input, change the preview image to a basic screen (e.g., a black screen) on the second display 422.

In the state 622, the processor 410 may display the preview image obtained by using the first camera 441 in the first display area 601 and the second display area 602 of the first display 421.

According to an embodiment, the user of the electronic device 400 may use the electronic device 400 in a state in which the preview image obtained by using the first camera 441 is displayed on the first display 421 to photograph an external environment by using the first camera 441. For example, a posture of the electronic device 400 may be a second posture in which the second camera 442 faces the user. The processor 410 may display the preview image obtained by using the first camera 441 through the first display 421 while the posture of the electronic device 400 is the second posture. While the posture of the electronic device 400 is the second posture, the preview image obtained by using the first camera 441 may include objects related to the external environment of the user.

For convenience of explanation, embodiments described below may be described based on the electronic device 400 illustrated in FIG. 6.

Figure 7:
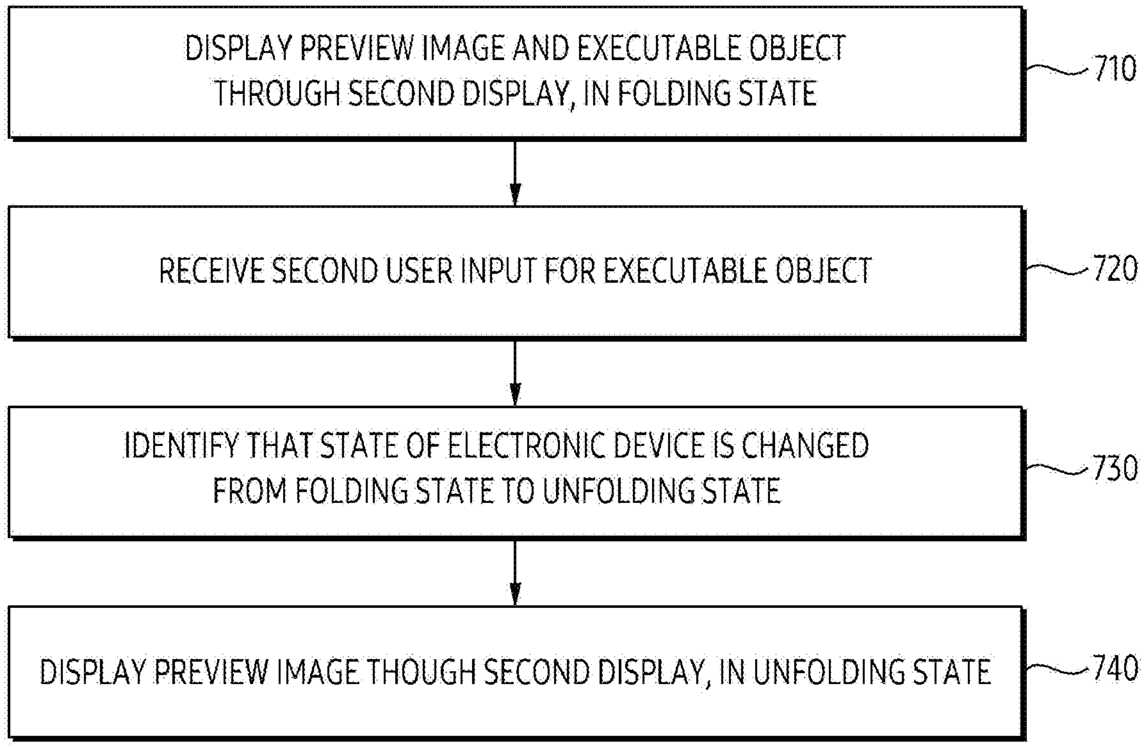
FIG. 7 illustrates a flowchart related to an operation of an electronic device according to an embodiment of the disclosure.

FIG. 7 illustrates a flowchart related to an operation of an electronic device according to an embodiment of the disclosure.

Referring to FIG. 7, operations 710 to 730 may be performed before the operation 510 of FIG. 5 is performed.

In the operation 710, a processor 410 may display a preview image and an executable object through a second display 422 in a folding state. For example, the processor 410 may display the preview image and the executable object used to maintain a display for displaying the preview image as a first display 421 through the second display 422 among the first display 421 and the second display 422 in the folding state in which a first direction toward which a first display area 601 faces and a second direction toward which a second display area 602 faces are opposite.

According to an embodiment, the electronic device 400 may operate in the folding state in which the first direction toward which the first display area 601 faces and the second direction toward which the second display area 602 faces are opposite.

According to an embodiment, in the folding state, the processor 410 may display a first user interface related to a camera application through the second display 422. The processor 410 may display a preview image obtained by using one of a first camera 441 and a second camera 442 through the second display 422. For example, the processor 410 may display a preview image obtained by using the first camera 441 through the second display 422.

According to an embodiment, the processor 410 may display the executable object used to maintain the display for displaying the preview image as the first display 421. For example, the executable object may be included in the first user interface related to the camera application displayed by using the second display 422. For example, the executable object may be used to maintain the second display 422 as a display for displaying the preview image obtained by using the first camera 441, even in an unfolding state.

In an operation 720, the processor 410 may receive (or identify) a second user input for an executable object. For example, the processor 410 may receive the second user input for the executable object displayed through the second display 422. For example, the processor 410 may set to maintain the display for displaying the preview image as the second display 422 even when a state of the electronic device 400 changes to the unfolding state based on the second user input.

For example, the processor 410 may, in response to the second user input, maintain a display for providing a main screen as the second display 422. The processor 410 may, in response to the second user input, maintain the display for providing the main screen as the second display 422 regardless of the state (e.g., the folding state or the unfolding state) of the electronic device 400. For example, the processor 410 may, in response to the second user input, maintain a display for providing an auxiliary screen as the first display 421. The processor 410 may, in response to the second user input, maintain the display for providing the auxiliary screen as the first display 421 regardless of the state (e.g., the folding state or the unfolding state) of the electronic device 400.

In the operation 730, the processor 410 may identify that the state of the electronic device 400 is changed from the folding state to the unfolding state. For example, after receiving (or identifying) the second user input for the executable object, the processor 410 may identify that the state of the electronic device 400 is changed from the folding state to the unfolding state.

For example, the processor 410 may identify an angle between the first direction toward which the first display area 601 faces and the second direction toward which the second display area 602 faces by using a hall sensor 431. The processor 410 may identify that the angle is changed from a first angle (e.g., 180 degrees) to a second angle (e.g., 0 degree). The processor 410 may identify that the state of the electronic device 400 is changed from the folding state to the unfolding state by using the hall sensor 431.

In the operation 740, the processor 410 may display the preview image through the second display 422 in the unfolding state. For example, the processor 410 may display the preview image through the second display 422 among the first display 421 and the second display 422 in the unfolding state. For example, even in case that the state of the electronic device 400 changes from the folding state to the unfolding state, the processor 410 may maintain the display for displaying the preview image as the second display 422.

According to an embodiment, after the operation 730 is performed, the processor 410 may perform the operations 510 to 530 of FIG. 5.

According to an embodiment, while the preview image and the executable object are displayed through the second display 422 in the folding state, the processor 410 may identify that the state of the electronic device 400 is changed from the folding state to the unfolding state. For example, the processor 410 may identify that the state of the electronic device 400 is changed from the folding state to the unfolding state in a state in which the second user input for the executable object is not received. The processor 410 may display the preview image obtained by using the first camera 441 through the first display 421 among the first display 421 and the second display 422 in the unfolding state, based on identifying that the state of the electronic device 400 is changed from the folding state to the unfolding state. For example, the processor 410 may switch (or change) the display for providing the main screen from the second display 422 to the first display 421 based on identifying that the state of the electronic device 400 is changed from the folding state to the unfolding state. The processor 410 may switch (or change) the display for providing the auxiliary screen from the first display 421 to the second display 422 based on identifying that the state of the electronic device 400 is changed from the folding state to the unfolding state.

Figure 8:
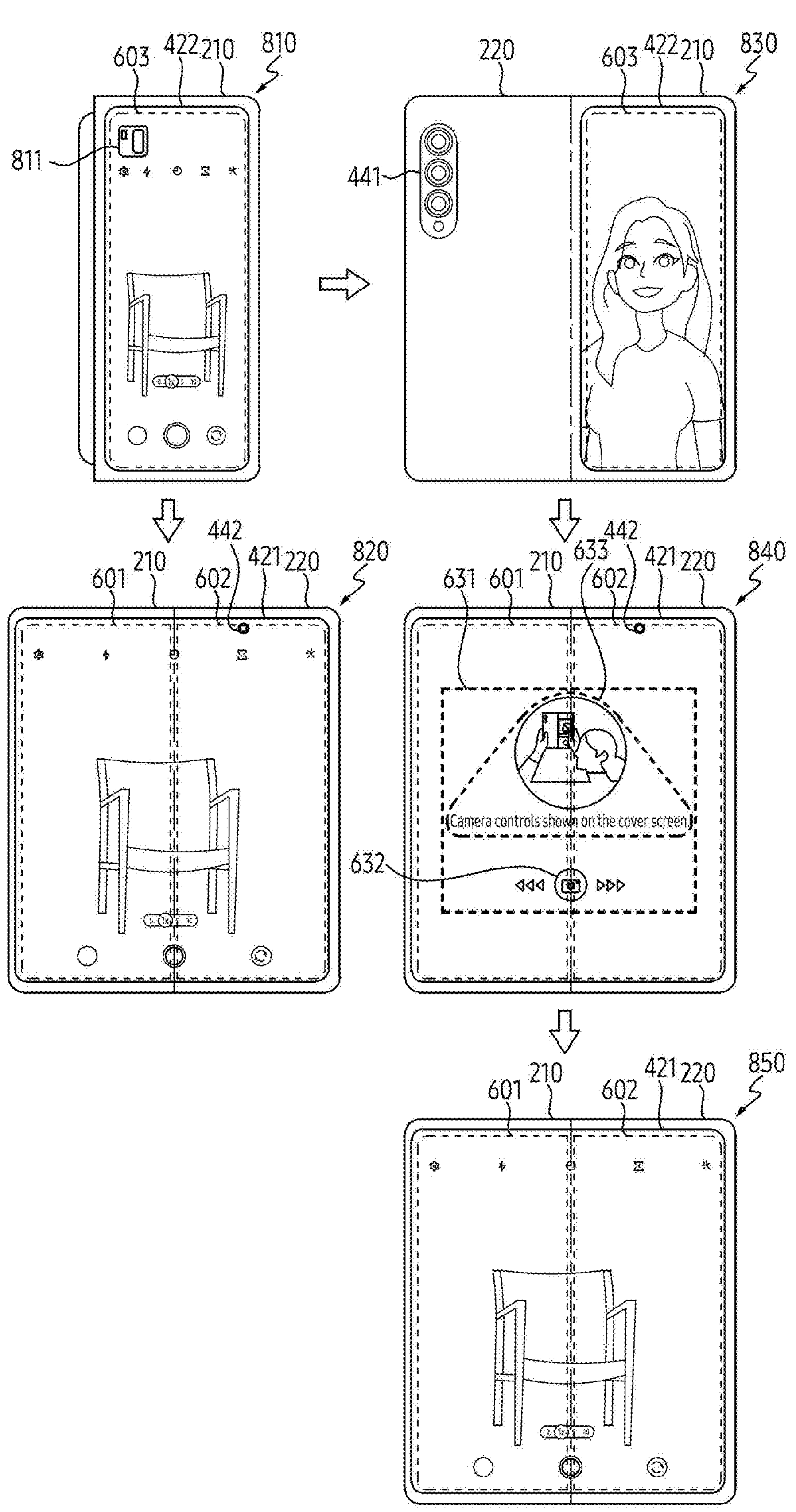
FIG. 8 illustrates an example of an operation of an electronic device according to an embodiment of the disclosure.

FIG. 8 illustrates an example of an operation of an electronic device according to an embodiment of the disclosure.

Referring to FIG. 8, in a state 810, an electronic device 400 may operate in a folding state. For example, the processor 410 may identify that a first direction toward which a first display area 601 faces and a second direction toward which a second display area 602 faces are opposite by using the hall sensor 431. The processor 410 may identify that a state of the electronic device 400 is in the folding state based on identifying that the first direction and the second direction are opposite.

According to an embodiment, the processor 410 may display a preview image obtained by using a first camera 441 by using a second display 422 in the folding state. The processor 410 may display an executable object 811 together with the preview image. For example, the processor 410 may display a first user interface related to a camera application. The first user interface may include the preview image and the executable object 811. For example, the executable object 811 may be used to maintain a display for displaying the preview image obtained by using the first camera 441 as the second display 422, even in an unfolding state.

According to an embodiment, the processor 410 may identify whether a second user input for the executable object 811 is received.

In a state 820, in case that the second user input for the executable object 811 is not received, the processor 410 may identify that the state of the electronic device 400 is changed from the folding state to the unfolding state. The processor 410 may display the preview image obtained by using the first camera 441 through a first display 421 based on identifying that the state of the electronic device 400 is changed from the folding state to the unfolding state. For example, the processor 410 may display the preview image obtained by using the first camera 441 in the first display area 601 and the second display area 602 of the first display 421.

In a state 830, in case that the second user input for the executable object 811 is received, the processor 410 may identify that the state of the electronic device 400 is changed from the folding state to the unfolding state. The processor 410 may display the preview image obtained by using the first camera 441 through the second display 422. Even in case that the state of the electronic device 400 changes from the folding state to the unfolding state, the processor 410 may maintain the display for displaying the preview image obtained by using the first camera 441 as the second display 422.

In a state 840, the processor 410 may display a visual affordance 631 on the first display 421 while the preview image obtained by using the first camera 441 is displayed on the second display 422. For example, the visual affordance 631 may include information indicating that the preview image is displayed on the second display 422, and a visual object 632 for receiving a first user input. The information indicating that the preview image is displayed on the second display may be displayed in an area 633.

According to an embodiment, the processor 410 may receive (or identify) the first user input for the visual object 632. For example, the processor 410 may receive at least one touch input for the visual object 632.

In a state 850, the processor 410 may, in response to the first user input, display the preview image obtained by using the first camera 441 on the first display 421. The processor 410 may cease displaying the preview image on the second display 422. For example, the state 850 may correspond to the state 622 of FIG. 6.

Figure 9:
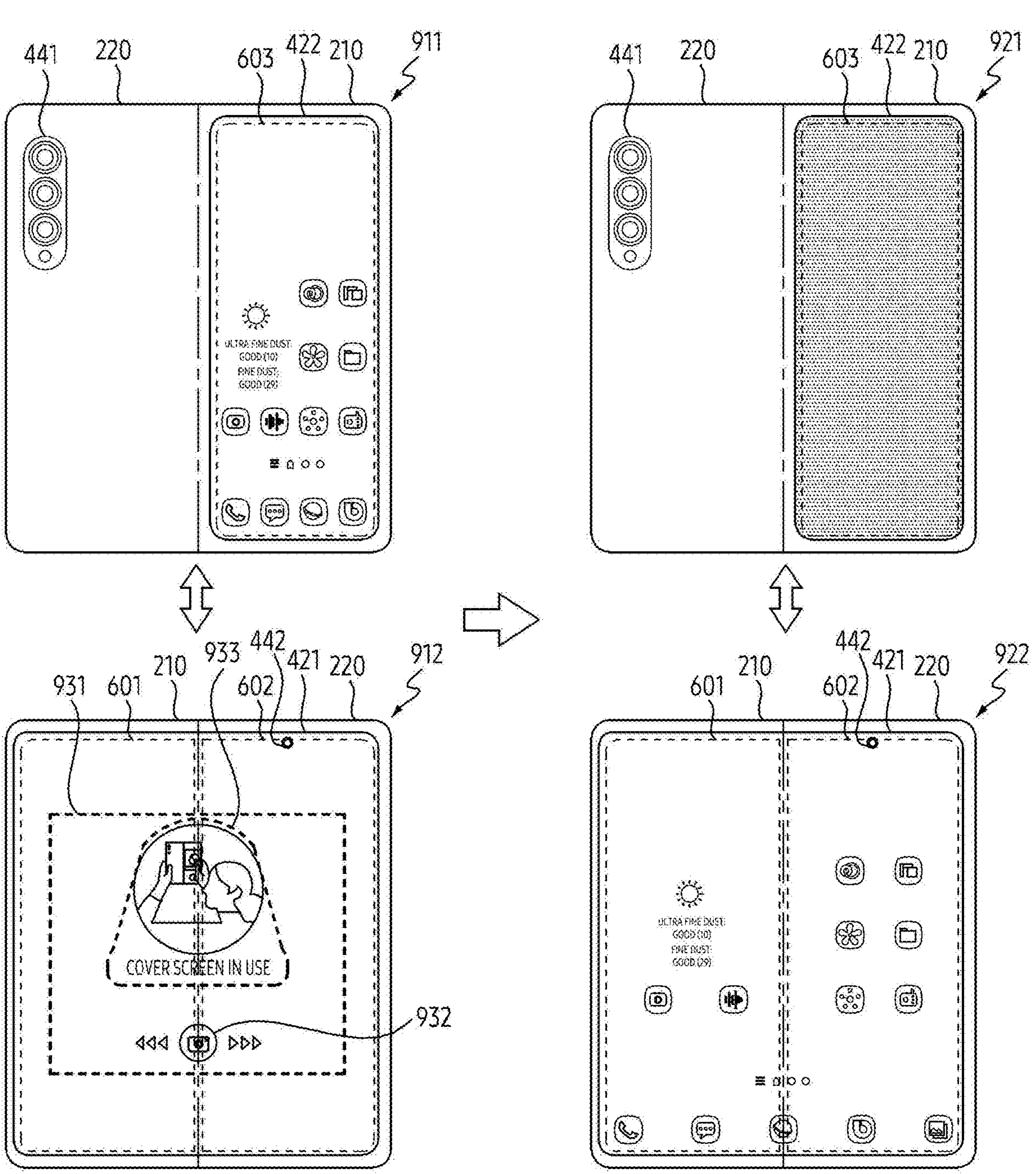
FIG. 9 illustrates an example of an operation of an electronic device according to an embodiment of the disclosure.

FIG. 9 illustrates an example of an operation of an electronic device according to an embodiment of the disclosure.

Referring to FIG. 9, in states 911, 912, 921, and 922, an electronic device 400 may operate in an unfolding state in which a first direction toward which a first display area 601 faces corresponds to a second direction toward which a second display area 602 faces.

The state 911 and a state 912 illustrate an example of an operation of the electronic device 400 at a first time point. The state 911 illustrates a top view of the electronic device 400 at the first time point. The state 912 illustrates a bottom view of the electronic device 400 at the first time point.

The state 921 and the state 922 illustrate an example of an operation of the electronic device 400 at a second time point. The state 921 illustrates a top view of the electronic device 400 at the second time point. The state 922 illustrates a bottom view of the electronic device 400 at the second time point.

In the state 911, the processor 410 may display a home screen in a third display area 603 of a second display 422. According to an embodiment, the processor 410 may receive (or identify) an input for ceasing display of a preview image while the preview image is displayed through the second display 422. The processor 410 may display the home screen through the second display 422 based on the input for ceasing the display of the preview image.

In the state 912, while the home screen is displayed in the third display area 603 of the second display 422, the processor 410 may display a visual affordance 931 in the first display area 601 and the second display area 602 of a first display 421. For example, the visual affordance 931 may include information indicating that the second display 422 is in use and a visual object 932 for receiving a first user input. For example, the information indicating that the second display 422 is in use may be displayed in an area 933.

According to an embodiment, the processor 410 may receive (or identify) the first user input for the visual object 932. The processor 410 may receive (or identify) at least one touch input for the visual object 932. The processor 410 may identify the at least one touch input for the visual object 932 as the first user input. For example, the processor 410 may identify (or determine) whether to switch (or change) a display on which the home screen is displayed from the second display 422 to the first display 421 based on whether the first user input is received.

In the state 921, the processor 410 may, in response to the first user input, cease displaying the home screen on the second display 422. For example, the processor 410 may, in response to the first user input, change the second display 422 from an active state to an inactive state. For example, the processor 410 may, in response to the first user input, change the home screen to a basic screen (e.g., a black screen) on the second display 422. The state 921 may correspond to the state 621 of FIG. 6.

In the state 922, the processor 410 may display the home screen in the first display area 601 and the second display area 602 of the first display 421. For example, the processor 410 may, in response to the first user input, display the home screen through the first display 421 among the first display 421 and the second display 422.

FIG. 9 illustrates an example in which a display for displaying the home screen is changed from the second display 422 to the first display 421 based on the first user input, but it is not limited thereto. In case that the second display 422 is used as a main display, the processor 410 may switch (or change) the main display from the second display 422 to the first display 421 based on the first user input. For example, in case that various screens (e.g., an application execution screen or a standby screen) are displayed through the second display 422, the processor 410 may switch (or change) a display on which the various screens are displayed from the second display 422 to the first display 421 based on the first user input.

Figure 10A:
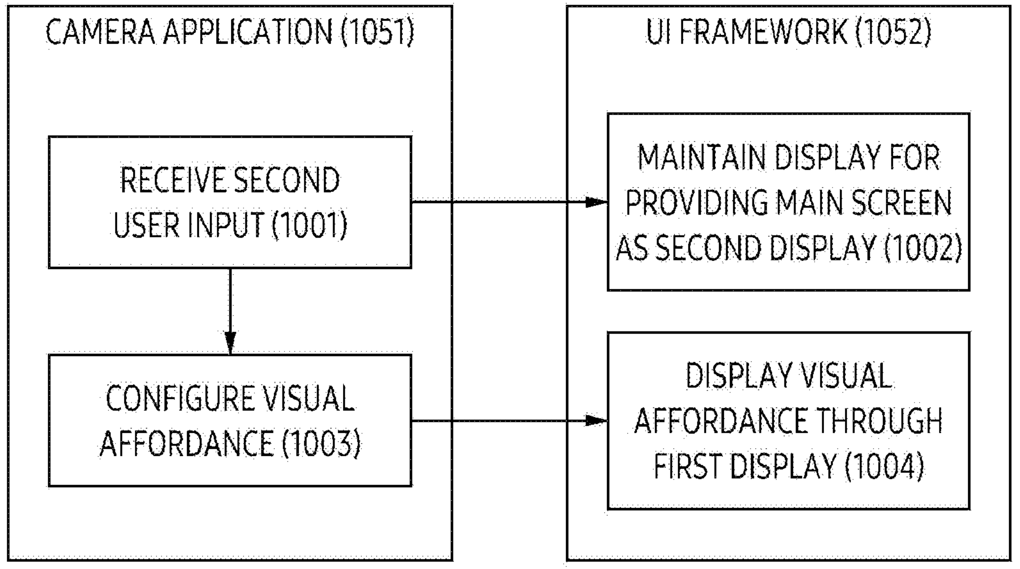
FIG. 10A illustrates an example of an operation performed by a processor according to an embodiment of the disclosure.

FIG. 10A illustrates an example of an operation performed by a processor according to an embodiment of the disclosure.

Referring to FIG. 10A, operations 1001 to 1004 are examples of an operation performed by a processor 410 based on execution of one of a camera application 1051 and a UI framework 1052. The operations 1001 to 1004 may be related to the operations 710 to 740 of FIG. 7.

In an operation 1001, an electronic device 400 may operate in a folding state. The processor 410 may receive a second user input based on execution of the camera application 1051. For example, the processor 410 may receive the second user input in a first user interface related to the camera application 1051. For example, the second user input may include an input for an executable object used to maintain a display for displaying a preview image, the executable object being included in the first user interface as a first display 421.

In an operation 1002, the processor 410 may maintain a display for providing a main screen as a second display 422 based on execution of the UI framework 1052. According to the reception of the second user input, the processor 410 may maintain the display for providing the main screen as the second display 422 based on the execution of the UI framework 1052. For example, using the UI framework 1052, the processor 410 may set the display for providing the main screen to be maintained as the second display 422 even in case that a state of the electronic device 400 changes from the folding state to an unfolding state.

In an operation 1003, after the second user input is received, the processor 410 may identify that the state of the electronic device 400 is switched (or changed) from the folding state to the unfolding state. After identifying that the state of the electronic device 400 is switched from the folding state to the unfolding state, the processor 410 may configure a visual affordance based on the execution of the camera application 1051. For example, the processor 410 may configure the visual affordance including information indicating that the preview image is displayed on the second display 422 and a visual object for receiving a first user input based on the execution of the camera application 1051.

In the operation 1004, the processor 410 may display the visual affordance through the first display 421 based on the execution of the UI framework 1052. The processor 410 may display the visual affordance configured based on the execution of the camera application 1051 through the first display 421 based on the execution of the UI framework 1052.

Figure 10B:
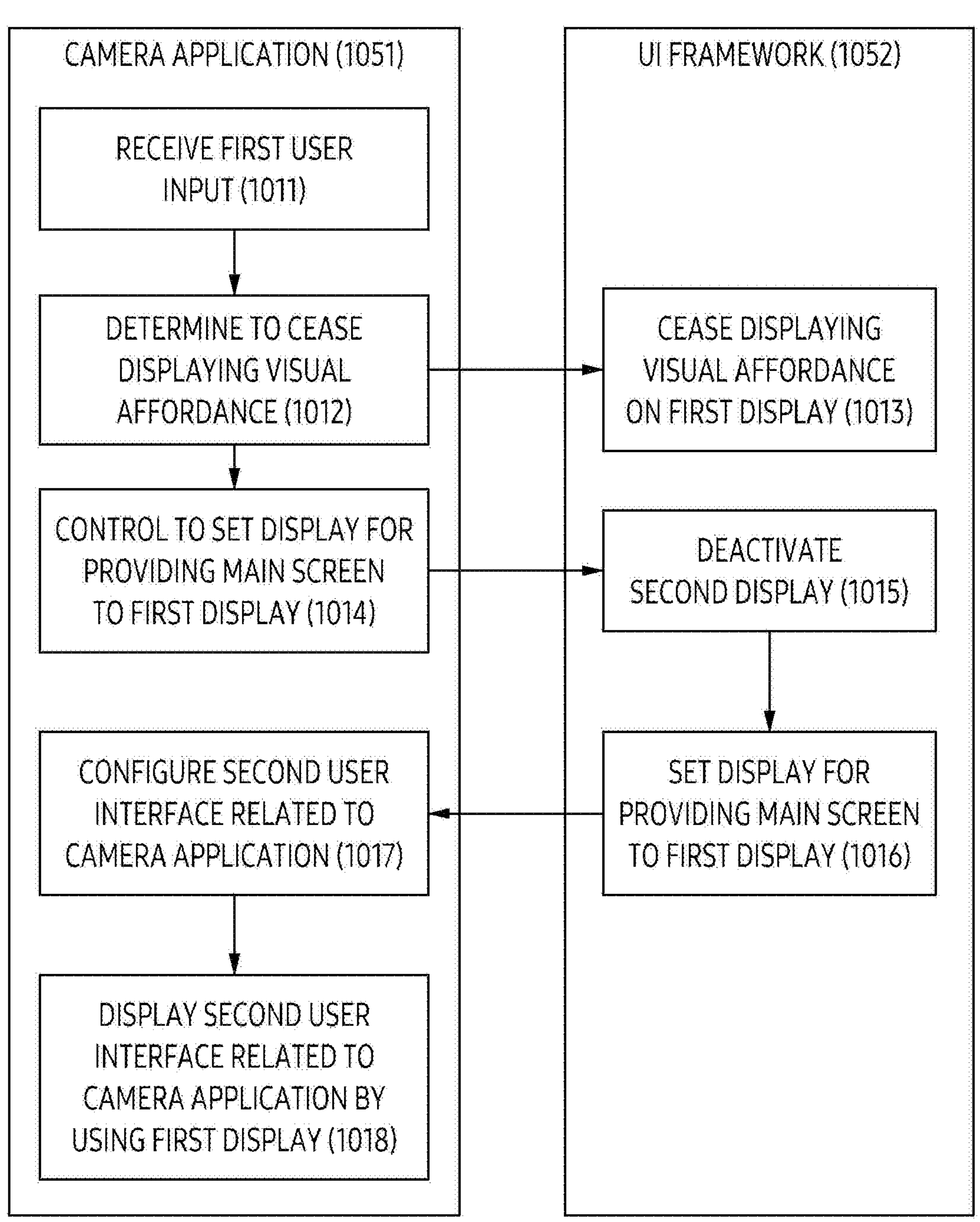
FIG. 10B illustrates an example of an operation performed by a processor according to an embodiment of the disclosure.

FIG. 10B illustrates an example of an operation performed by a processor according to an embodiment of the disclosure.

Referring to FIG. 10B, operations 1011 to 1018 are examples of an operation performed by a processor 410 based on execution of one of a camera application 1051 and a UI framework 1052. The operations 1011 to 1018 may correspond to the operations 510 to 530 of FIG. 5. For example, the operation 1011 may be performed after the operation 1004 of FIG. 10A is performed.

In the operation 1011, the electronic device 400 may operate in an unfolding state. In the unfolding state, the processor 410 may display a preview image obtained by using a first camera 441 using a second display 422. While the preview image obtained by using the first camera 441 is displayed on the second display 422, the processor 410 may receive a first user input based on the execution of the camera application 1051. For example, the processor 410 may receive the first user input according to a visual affordance displayed on a first display 421. For example, the processor 410 may identify at least one touch input for an executable object included in the visual affordance as the first user input.

In an operation 1012, the processor 410 may determine to cease displaying the visual affordance based on the execution of the camera application 1051. The processor 410 may determine to cease displaying the visual affordance according to the first user input based on the execution of the camera application 1051. For example, the processor 410 may determine to cease displaying the visual affordance by terminating a presentation dialog based on the execution of the camera application 1051.

In an operation 1013, the processor 410 may cease displaying the visual affordance on the first display 421 based on the execution of the UI framework 1052. As the processor 410 determines to cease displaying the visual affordance, the processor 410 may cease displaying the visual affordance on the first display 421 based on the execution of the UI framework 1052.

In an operation 1014, the processor 410 may control the execution of the UI framework 1052 to set a display for providing a main screen to the first display 421 based on the execution of the camera application 1051. For example, the processor 410 may transmit information for controlling the main screen to be set to the first display 421 to the UI framework 1052 by using the camera application 1051.

In an operation 1015, the processor 410 may deactivate the second display 422 based on the execution of the UI framework 1052. By deactivating the second display 422, the processor 410 may cease displaying the preview image obtained by using the first camera 441.

In an operation 1016, the processor 410 may set the display for providing the main screen to the first display 421 based on the execution of the UI framework 1052. For example, the processor 410 may allocate a process (e.g., a window manager or an event handler for processing a touch event) corresponding to the main screen to the first display 421.

In operation 1017, the processor 410 may configure a second user interface related to the camera application 1051 based on the execution of the camera application 1051. For example, the processor 410 may configure the second user interface related to the camera application 1051 without performing a pause function (e.g., calling a OnPause( ) function) and a restart function (e.g., calling a OnResume( ) function) related to the camera application 1051.

In operation 1018, the processor 410 may display the second user interface related to the camera application 1051 by using the first display 421 based on the execution of the camera application 1051.

Figure 11:
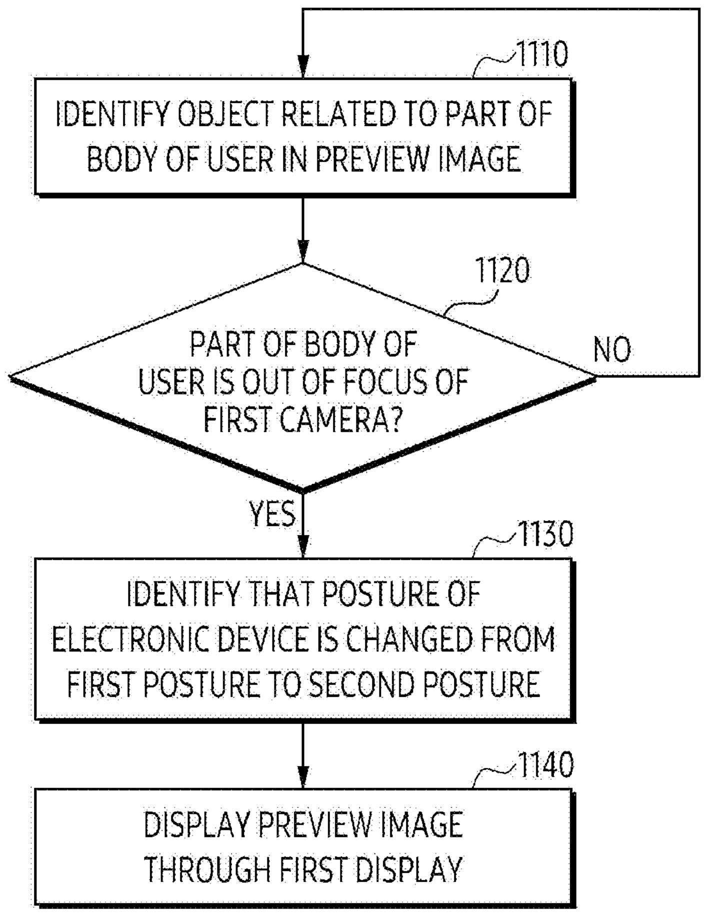
FIG. 11 illustrates a flowchart related to an operation of an electronic device according to an embodiment of the disclosure.

FIG. 11 illustrates a flowchart related to an operation of an electronic device according to an embodiment of the disclosure.

Referring to FIG. 11, in an operation 1110, a processor 410 may identify an object related to a part of a body of a user (e.g., the user's face) in a preview image. For example, the processor 410 may identify the object related to the part of the body of the user of an electronic device 400 within the preview image displayed through a second display 422, in an unfolding state.

According to an embodiment, the electronic device 400 may operate in a first posture. For example, the processor 410 may identify a posture of the electronic device 400 by using a gyroscope sensor 432. The processor 410 may identify that the posture of the electronic device 400 is the first posture in which a first camera 441 faces the user of the electronic device 400. For example, the processor 410 may display the preview image including the object related to the part of the body the user through the second display 422, by using the first camera 441.

According to an embodiment, the processor 410 may identify that the object included in the preview image represents the part of the body of the user based on a preset model. For example, the preset model may be indicated by a plurality of parameters related to a neural network (or machine learning). For example, the preset model may include a set of the parameters related to the neural network. The plurality of parameters may indicate a plurality of nodes included in the neural network and/or a weight assigned to a connection between the plurality of nodes.

For example, the processor 410 may identify that a subject of the first camera 441 is the part of the body of the user based on identifying that the object included in the preview image represents the part of the body of the user.

In an operation 1120, the processor 410 may identify whether the part of the body of the user is out of a focus of the first camera 441. For example, the processor 410 may identify whether the posture of the electronic device 400 is changed based on identifying whether the part of the body of the user is out of the focus of the first camera 441.

According to an embodiment, the processor 410 may perform the operation 1110 again based on the part of the body of the user not being out of the focus of the first camera 441.

In operation 1130, in case that the part of the body of the user is out of the focus of the first camera 441, the processor 410 may identify that the posture of the electronic device 400 is changed from the first posture to a second posture. The processor 410 may identify that the posture of the electronic device 400 is changed from the first posture to the second posture based on identifying that the part of the body of the user is out of the focus of the first camera 441. For example, the processor 410 may identify, by using the gyroscope sensor 432, that the posture of the electronic device 400 changes from the first posture in which the first camera 441 faces the user of the electronic device 400 to the second posture in which a second camera 442 faces the user based on identifying that the part of the body of the user is out of the focus of the first camera 441.

According to an embodiment, the processor 410 may identify that the posture of the electronic device 400 has been changed based on identifying that the part of the body of the user is out of the focus of the first camera 441. After identifying that the part of the body of the user is out of the focus of the first camera 441, the processor 410 may identify that the posture of the electronic device 400 has changed from the first posture to the second posture.

According to an embodiment, after identifying that the part of the body of the user is out of the focus of the first camera 441, the processor 410 may identify that the posture of the electronic device 400 has been changed from the first posture to the second posture, based on an object (e.g., a chair) identified by using the second camera 442 being identified by using the first camera 441 while the electronic device 400 is in the first posture.

In an operation 1140, the processor 410 may display the preview image through the first display 421. For example, the processor 410 may display the preview image obtained by using the first camera 441 through the first display 421 among the first display 421 and the second display 422 based on identifying that the posture of the electronic device 400 is changed from the first posture to the second posture.

According to an embodiment, the user of the electronic device 400 may check the preview image obtained through the first camera 441 by using the second display 422 using the electronic device 400 in the unfolding state. The user of the electronic device 400 may turn over the electronic device 400 to check the preview image obtained through the first camera by using the first display 421. The processor 410 may identify whether the electronic device 400 is turned over by using the gyroscope sensor 432. The processor 410 may display the preview image obtained through the first camera 441 through the first display 421 based on identifying that the electronic device 400 is turned over.

Figure 12:
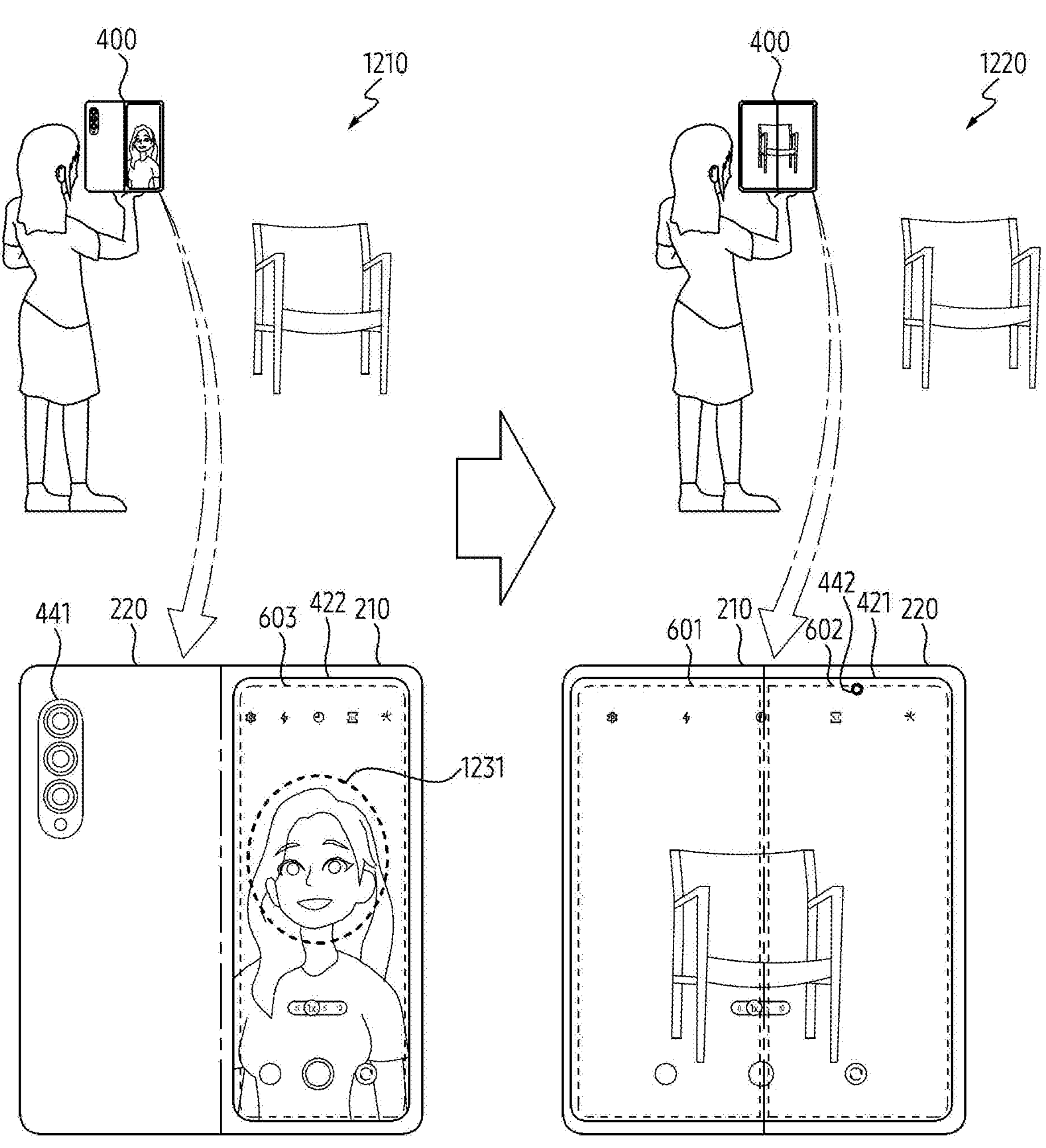
FIG. 12 illustrates an example of an operation of an electronic device according to an embodiment of the disclosure.

FIG. 12 illustrates an example of an operation of an electronic device according to an embodiment of the disclosure.

Referring to FIG. 12, in a state 1210, an electronic device 400 may operate in an unfolding state. The electronic device 400 may operate in the unfolding state corresponding to a first direction toward which a first display area 601 faces and a second direction toward which a second display area 602 faces. According to an embodiment, the electronic device 400 may operate in a first posture. The processor 410 may identify that a posture of the electronic device 400 is the first posture in which a first camera 441 faces a user of the electronic device 400.

According to an embodiment, the processor 410 may display a first user interface related to a camera application through a second display 422. The first user interface may include a preview image obtained by using the first camera 441. The processor 410 may identify that an object 1231 included in the preview image represents a part of a body of a user (e.g., a face of the user). The processor 410 may identify that a subject of the first camera 441 is the part of the body of the user based on identifying that the object 1231 included in the preview image represents the part of the body of the user.

According to an embodiment, the processor 410 may identify whether the part of the body of the user (e.g., the face of the user) is out of a focus of the first camera 441. For example, the processor 410 may identify that the part of the body of the user is out of the focus of the first camera 441 based on identifying that the object 1231 is not displayed in the preview image obtained by using the first camera 441. The processor 410 may identify whether the posture of the electronic device 400 is changed based on identifying that the part of the body of the user is out of the focus of the first camera 441.

In a state 1220, the processor 410 may identify that the posture of the electronic device 400 is changed from the first posture to the second posture based on identifying that the part of the body of the user is out of the focus of the first camera 441.

For example, the processor 410 may activate the first display 421 based on identifying that the posture of the electronic device 400 is changed from the first posture to the second posture. The processor 410 may deactivate the second display 422 based on identifying that the posture of the electronic device 400 is changed from the first posture to the second posture.

For example, the processor 410 may display the preview image obtained by using the first camera 441 using the first display 421 among the first display 421 and the second display 422 based on identifying that the posture of the electronic device 400 is changed from the first posture to the second posture. For example, the processor 410 may switch (or change) a display for displaying the preview image from the second display 422 to the first display 421 based on identifying that the posture of the electronic device 400 is changed from the first posture to the second posture. For example, the processor 410 may display a second user interface in the first display area 601 and the second display area 602 of the first display 421. The second user interface may display the preview image obtained by using the first camera 441.

Figure 13:
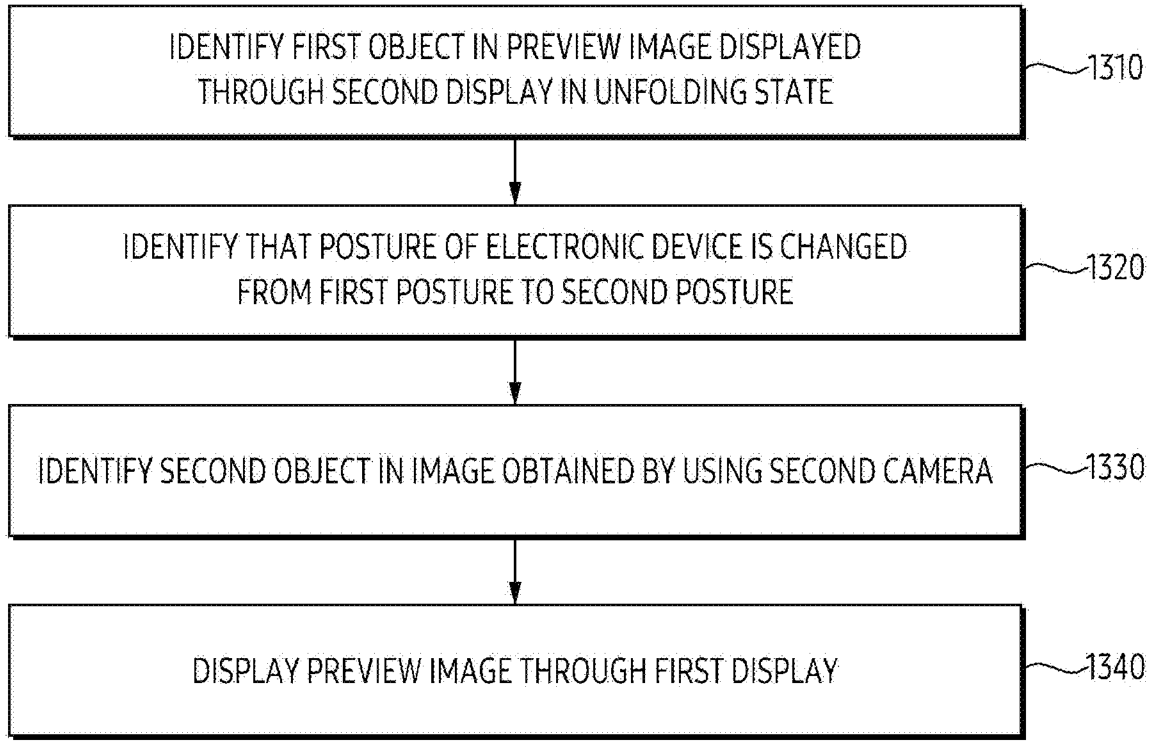
FIG. 13 illustrates a flowchart related to an operation of an electronic device according to an embodiment of the disclosure.

FIG. 13 illustrates a flowchart related to an operation of an electronic device according to an embodiment of the disclosure.

Referring to FIG. 13, in an operation 1310, a processor 410 may identify a first object in a preview image displayed through a second display 422 in an unfolding state. For example, the processor 410 may identify the first object related to a part of a body of a user of an electronic device 400 in the preview image displayed on the second display 422, in the unfolding state.

According to an embodiment, the electronic device 400 may operate in a first posture. For example, the processor 410 may identify a posture of the electronic device 400 by using a gyroscope sensor 432. The processor 410 may identify that the posture of the electronic device 400 is the first posture in which a first camera 441 faces the user of the electronic device 400. For example, the processor 410 may display the preview image including the first object related to the part of the body of the user through the second display 422, by using the first camera 441.

For example, the processor 410 may identify that a subject of the first camera 441 is the part of the body of the user based on identifying that the first object included in the preview image represents the part of the body of the user.

In an operation 1320, the processor 410 may identify that the posture of the electronic device 400 is changed from the first posture to a second posture. For example, after identifying the first object related to the part of the body of the user, the processor 410 may identify that the posture of the electronic device 400 is changed from the first posture in which the first camera 441 faces the user to the second posture in which a second camera 442 faces the user.

According to an embodiment, after identifying the first object related to the part of the body of the user, the processor 410 may identify whether the posture of the user changes from the first posture to the second posture by using the gyroscope sensor 432. The processor 410 may identify that the posture of the user is changed from the first posture to the second posture by using the gyroscope sensor 432.

In an operation 1330, the processor 410 may identify a second object in an image obtained by using the second camera 442. For example, the processor 410 may identify the second object related to the part of the body of the user in the image obtained by using the second camera 442.

According to an embodiment, the processor 410 may obtain the image by using the second camera 442. The image obtained by using the second camera 442 may not be displayed on both a first display 421 and the second display 422. The processor 410 may identify the second object related to the part of the body of the user in the image in a state in which the image obtained by using the second camera 442 is not displayed. The processor 410 may identify that the second object corresponds to the first object. The processor 410 may identify that the user is looking at the first display 421 based on identifying that the second object corresponds to the first object.

In an operation 1340, the processor 410 may display the preview image through the first display 421. For example, the processor 410 may display the preview image obtained by using the first camera 441 through the first display 421 among the first display 421 and the second display 422.

Figure 14:
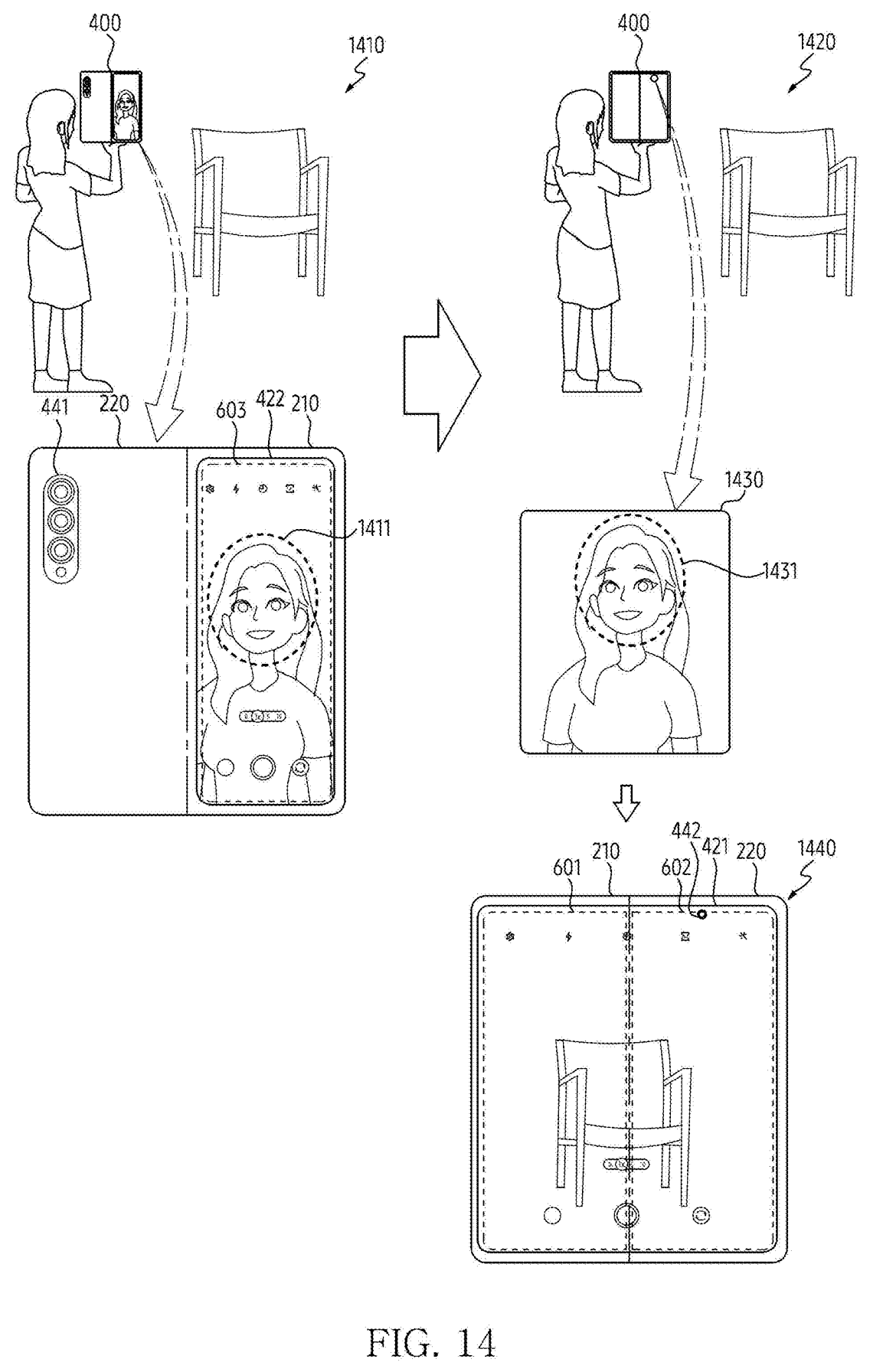

FIG. 14 illustrates an example of an operation of an electronic device according to an embodiment of the disclosure.

Referring to FIG. 14, in a state 1410, an electronic device 400 may operate in an unfolding state. The electronic device 400 may operate in the unfolding state corresponding to a first direction toward which a first display area 601 faces and a second direction toward which a second display area 602 faces. According to an embodiment, the electronic device 400 may operate in a first posture. The processor 410 may identify that a posture of the electronic device 400 is the first posture in which a first camera 441 faces a user of the electronic device 400.

According to an embodiment, the processor 410 may display a first user interface related to a camera application through a second display 422. The first user interface may include a preview image obtained by using the first camera 441. The processor 410 may identify that a first object 1411 included in the preview image represents a part of a body of a user (e.g., a face of the user). For example, the processor 410 may identify that the first object 1411 represents the part of the body of the user by using a preset model. Based on identifying that the first object 1411 included in the preview image represents the part of the body of the user, the processor 410 may identify that a subject of the first camera 441 is the part of the body of the user.

In a state 1420, the processor 410 may identify that the posture of the electronic device 400 is changed from the first posture to a second posture. For example, after identifying the first object 1411 related to the part of the body of the user, the processor 410 may identify that the posture of the electronic device 400 is changed from the first posture in which the first camera 441 faces the user to the second posture in which a second camera 442 faces the user.

According to an embodiment, the processor 410 may obtain an image 1430 by using the second camera 442 based on identifying that the posture of the electronic device 400 is changed from the first posture to the second posture by using a gyroscope sensor 432. The processor 410 may identify, in the image 1430, a second object 1431 related to the part of the body of the user. The processor 410 may identify whether the second object 1431 corresponds to the first object 1411.

For example, the processor 410 may not display the image 1430 on a first display 421. The processor 410 may obtain the image 1430 by using the second camera 442 while the preview image obtained by using the first camera 441 is displayed on the second display 422. The processor 410 may identify, in the image 1430, the second object 1431 related to the part of the body of the user.

In a state 1440, the processor 410 may identify that the second object 1431 corresponds to the first object 1411. The processor 410 may identify that the user is looking at the first display 421 based on identifying that the second object 1431 corresponds to the first object 1411. The processor 410 may display the preview image obtained by using the first camera 441 through the first display 421 based on identifying that the second object 1431 corresponds to the first object 1411. The processor 410 may display a second user interface including the preview image obtained by using the first camera 441 in the first display area 601 and the second display area 602 of the first display 421.

According to an embodiment, an electronic device (e.g., 101; 200; 400) may comprise a first housing (e.g., 210), a second housing (e.g., 220), a hinge structure rotatably connecting the first housing to the second housing based on a folding axis, a first display (e.g., 201; 421), which is foldable, comprising a first display area (e.g., 211; 601) corresponding to a surface of the first housing 210 and a second display area (e.g., 221; 602) corresponding to a surface of the second housing 220, wherein the first display area and the second display area are divided based on the folding axis according to the hinge structure, a second display (e.g., 202; 422) in the first housing 210, comprising a third display area opposite to the first display area (e.g., 211; 601), a first camera (e.g., 251; 441) disposed on another surface of the second housing (e.g., 220) opposite to the second display area (e.g., 221; 602), at least one sensor, and a processor (e.g., 410). The processor may be configured to display, through the second display (e.g., 202; 422) among the first display (e.g., 201; 421) and the second display (e.g., 202; 422), a preview image obtained using the first camera (e.g., 251; 441) in an unfolding state that a first direction toward which the first display area (e.g., 211; 601) faces corresponds to a second direction toward which the second display area (e.g., 221; 602) faces. The processor (e.g., 410) may be configured to receive (e.g., or identify) a first user input while the preview image is displayed through the second display (e.g., 202; 422). The processor (e.g., 410) may be configured to, in response to (e.g., or based on) the first user input, display (e.g., or provide) the preview image through the first display (e.g., 201; 421) among the first display (e.g., 201; 421) and the second display (e.g., 202; 422).

According to an embodiment, the processor (e.g., 410) may be configured to display a visual affordance (e.g., 631; 931) for receiving the first user input through the first display (e.g., 201; 421) while the preview image is displayed through the second display (e.g., 202; 422). The processor (e.g., 410) may be configured to display, in response to receiving (e.g., or identifying) the first user input according to the visual affordance (e.g., 631; 931), the preview image through the first display (e.g., 201; 421) among the first display (e.g., 201; 421) and the second display (e.g., 202; 422).

According to an embodiment, the visual affordance (e.g., 631; 931) may comprise information indicating that the preview image is displayed on the second display (e.g., 202; 422) and a visual object for receiving the first user input.

According to an embodiment, the processor (e.g., 410) may be configured to cease display of the visual affordance (e.g., 631; 931) in response to the first user input.

According to an embodiment, the processor (e.g., 410) may be configured to identify at least one touch input for the visual object comprised in the visual affordance (e.g., 631; 931), as the first user input.

According to an embodiment, the processor (e.g., 410) may be configured to receive (e.g., or identify) an input for ceasing the display of the preview image while the preview image is displayed through the second display (e.g., 202; 422). The processor (e.g., 410) may be configured to, based on the input, display a home screen through the second display (e.g., 202; 422). The processor (e.g., 410) may be configured to, while the home screen is displayed through the second display (e.g., 202; 422), receive the first user input. The processor (e.g., 410) may be configured to, in response to the first user input, display the home screen through the first display (e.g., 201; 421) among the first display (e.g., 201; 421) and the second display (202; 422).

According to an embodiment, the electronic device (e.g., 101; 400) may comprise a second camera (e.g., 252; 442) disposed to face a direction toward which the first display (e.g., 201; 421) faces. The processor (e.g., 410) may be configured to, while displaying the preview image through the second display (e.g., 202; 422) in the unfolding state, identify that a posture of the electronic device (e.g., 101; 200; 400) is changed from a first posture in which the first camera (e.g., 251; 441) faces a user of the electronic device (e.g., 101; 200; 400) to a second posture in which the second camera (e.g., 252; 442) faces the user. The processor (e.g., 410) may be configured to, based on identifying that the posture of the electronic device (e.g., 101; 200; 400) is changed from the first posture to the second posture, display the preview image thought the first display (e.g., 201; 421) among the first display (e.g., 201; 421) and the second display (e.g., 202; 422).

According to an embodiment, the processor (e.g., 410) may be configured to identify an object related to a part of a body of the user in the preview image displayed in the unfolding state. The processor (e.g., 410) may be configured to, based on identifying that the part of the body of the user is out of a focus of the first camera (e.g., 251; 441), identify, using a gyroscope sensor (e.g., 432) comprised in the at least one sensor, that the posture of the electronic device (e.g., 101; 200; 400) is changed from the first posture in which the first camera (e.g., 251; 441) faces the user of the electronic device (e.g., 101; 200; 400) to the second posture in which the second camera (e.g., 252; 442) faces the user.

According to an embodiment, the electronic device (e.g., 101; 400) may comprise the second camera (e.g., 252; 442) disposed to face a direction toward which the first display (e.g., 201; 421) faces, and the processor (e.g., 410) may be configured to identify a first object (e.g., 1411) related to a part of a body of a user of the electronic device (e.g., 101; 200; 400) in the preview image displayed through the second display (e.g., 202; 422) in the unfolding state. The processor (e.g., 410) may be configured to, after identifying the first object (e.g., 1411) related to the part of the body of the user, identify that a posture of the electronic device (e.g., 101; 200; 400) is changed from the first posture in which the first camera (e.g., 251; 441) faces the user of the electronic device (e.g., 101; 200; 400) to the second posture in which the second camera (e.g., 252; 442) faces the user. The processor (e.g., 410) may be configured to, based on identifying a second object (e.g., 1431) related to the part of the body of the user in an image obtained using the second camera (e.g., 252; 442), display the preview image through the first display (e.g., 201; 421) among the first display (e.g., 201; 421) and the second display (e.g., 202; 422).

According to an embodiment, the electronic device (e.g., 101; 400) may comprise the second camera (e.g., 252; 442) disposed to face a direction toward which the first display (e.g., 201; 421) faces. The processor (e.g., 410) may be configured to display, through the second display (e.g., 202; 422) among the first display (e.g., 201; 421) and the second display (e.g., 202; 422), the preview image and an executable object used for maintaining a display for displaying the preview image as the first display (e.g., 201; 421), in a folding state in which the first direction and the second direction are opposite. The processor (e.g., 410) may be configured to receive (e.g., or identify) a second user input for the executable object displayed through the second display (e.g., 202; 422). The processor (e.g., 410) may be configured to, after receiving (e.g., or identifying) the second user input for the executable object, identify that a state of the electronic device (e.g., 101; 200; 400) is changed from the folding state to the unfolding state. The processor (e.g., 410) may be configured to display the preview image through the second display (e.g., 202; 422) among the first display (e.g., 201; 421) and the second display (e.g., 202; 422), in the unfolding state.

According to an embodiment, the processor (e.g., 410) may be configured to, in response to the second user input, maintain a display for providing a main screen as the second display (e.g., 202; 422). The processor (e.g., 410) may be configured to, in response to the second user input, maintain a display for providing an auxiliary screen as the first display (e.g., 201; 421).

According to an embodiment, the processor (e.g., 410) may be configured to, in response to the first user input, switch the display for providing the main screen from the second display (e.g., 202; 422) to the first display (e.g., 201; 421). The processor (e.g., 410) may be configured to, in response to the first user input, switch the display for providing the auxiliary screen from the first display (e.g., 201; 421) to the second display (e.g., 202; 422).

According to an embodiment, the processor (e.g., 410) may be configured to, while the preview image and the executable object are displayed through the second display (e.g., 202; 422) in the folding state, identify that the state of the electronic device (e.g., 101; 200; 400) is changed from the folding state to the unfolding state. The processor (e.g., 410) may be configured to display the preview image through the first display (e.g., 201; 421) among the first display (e.g., 201; 421) and the second display (e.g., 202; 422), in the unfolding state.

According to an embodiment, the preview image displayed though the second display (e.g., 202; 422) may be included in a first user interface set in the third display area. The preview image displayed through the first display (e.g., 201; 421) may be included in a second user interface set in the first display area (e.g., 211; 601) and the second display area (e.g., 221; 602).

According to an embodiment, the processor (e.g., 410) may be configured to deactivate the first camera (e.g., 251; 441) in response to an input related to an element included in the second user interface. The processor (e.g., 410) may be configured to activate the second camera (e.g., 252; 442) in response to the input to the element included in the second user interface. The processor (e.g., 410) may be configured to display another preview image obtained by using the second camera (e.g., 252; 442) through the first display (e.g., 201; 421).

According to an embodiment, a method of an electronic device (e.g., 101; 200; 400) may comprise, in an unfolding state that a first direction toward which a first display area (e.g., 211; 601) of a first display (e.g., 201; 421) among the first display (e.g., 201; 421) and a second display (e.g., 202; 422) comprised in the electronic device (e.g., 101; 200; 400) faces corresponds to a second direction toward which a second display area (e.g., 221; 602) of the first display (e.g., 201; 421) faces, displaying, through the second display (e.g., 202; 422) among the first display (e.g., 201; 421) and the second display (e.g., 202; 422), a preview image obtained using a first camera (e.g., 251; 441) of the electronic device (e.g., 101; 200; 400). The method may comprise receiving a first user input indicating a predetermined gesture while the preview image is displayed through the second display (e.g., 202; 422). The method may comprise, in response to the first user input, displaying the preview image through the first display (e.g., 201; 421) among the first display (e.g., 201; 421) and the second display (e.g., 202; 422).

According to an embodiment, the method may comprise displaying a visual affordance (e.g., 631; 931) for receiving the first user input through the first display (e.g., 201; 421) while the preview image is displayed through the second display (e.g., 202; 422). The method may comprise, in response to receiving (e.g., or identifying) the first user input according to the visual affordance (e.g., 631; 931), displaying the preview image through the first display (e.g., 201; 421) among the first display (e.g., 201; 421) and the second display (e.g., 202; 422).

According to an embodiment, the method may comprise receiving (e.g., or identifying) an input for ceasing the display of the preview image while the preview image is displayed through the second display (e.g., 202; 422). The method may comprise, based on the input, displaying a home screen through the second display (e.g., 202; 422). The method may comprise, while the home screen is displayed through the second display (e.g., 202; 422), receiving the first user input. The method may comprise, in response to the first user input, displaying the home screen through the first display (e.g., 201; 421) among the first display (e.g., 201; 421) and the second display (e.g., 202; 422).

According to an embodiment, the method may comprise, while displaying the preview image through the second display (e.g., 202; 422) in the unfolding state, identifying that a posture of the electronic device (e.g., 101; 200; 400) is changed from a first posture in which the first camera (e.g.,

251; 441) faces a user of the electronic device (e.g., 101; 200; 400) to a second posture in which the second camera (e.g., 252; 442) of the electronic device (e.g., 101; 200; 400) faces the user. The method may comprise, based on identifying that the posture of the electronic device (e.g., 101; 200; 400) is changed from the first posture to the second posture, displaying the preview image thought the first display (e.g., 201; 421) among the first display (e.g., 201; 421) and the second display (e.g., 202; 422).

According to an embodiment, the method may comprise identifying a part of a body of the user in the preview image displayed in the unfolding state. The method may comprise, based on identifying that the part of the body of the user is out of a focus of the first camera (e.g., 251; 441), identify, using a gyroscope sensor (e.g., 432) of the electronic device (e.g., 101; 200; 400), that the posture of the electronic device (e.g., 101; 200; 400) is changed from the first posture in which the first camera (e.g., 251; 441) faces the user of the electronic device (e.g., 101; 200; 400) to the second posture in which the second camera (e.g., 252; 442) faces the user.

According to an embodiment, an electronic device (e.g., 101; 200; 400) may comprise a first housing (e.g., 210), a second housing (e.g., 220), a hinge structure rotatably connecting the first housing to the second housing based on a folding axis, a first display (e.g., 201; 421), which is foldable, comprising a first display area (e.g., 211; 601) corresponding to a surface of the first housing 210 and a second display area (e.g., 221; 602) corresponding to a surface of the second housing 220, wherein the first display area and the second display area are divided based on the folding axis according to the hinge structure, a second display (e.g., 202; 422) in the first housing 210, comprising a third display area opposite to the first display area (e.g., 211; 601), a first camera (e.g., 251; 441) disposed on another surface of the second housing (e.g., 220) opposite to the second display area (e.g., 221; 602), at least one sensor, memory including one or more storage media, storing one or more computer programs, and one or more processors including processing circuitry. The one or more computer programs include computer-executable instructions that, when executed by the one or more processors individually or collectively, may cause the electronic device to display, through the second display (e.g., 202; 422) among the first display (e.g., 201; 421) and the second display (e.g., 202; 422), a preview image obtained using the first camera (e.g., 251; 441) in an unfolding state that a first direction toward which the first display area (e.g., 211; 601) faces corresponds to a second direction toward which the second display area (e.g., 221; 602) faces. The one or more computer programs include computer-executable instructions that, when executed by the one or more processors individually or collectively, may cause the electronic device to receive (e.g., or identify) a first user input while the preview image is displayed through the second display (e.g., 202; 422). The one or more computer programs include computer-executable instructions that, when executed by the one or more processors individually or collectively, may cause the electronic device to, in response to (e.g., or based on) the first user input, display (e.g., or provide) the preview image through the first display (e.g., 201; 421) among the first display (e.g., 201; 421) and the second display (e.g., 202; 422).

According to an embodiment, the one or more computer programs may include computer-executable instructions that, when executed by the one or more processors individually or collectively, may cause the electronic device to display a visual affordance for receiving the first user input through the first display while the preview image is displayed through the second display, and in response to receiving the first user input according to the visual affordance, display the preview image through the first display among the first display and the second display.

According to an embodiment, the visual affordance comprises information indicating that the preview image is displayed on the second display, and a visual object for receiving the first user input.

According to an embodiment, the one or more computer programs may include computer-executable instructions that, when executed by the one or more processors individually or collectively, may cause the electronic device to cease display of the visual affordance in response to the first user input.

According to an embodiment, the one or more computer programs may include computer-executable instructions that, when executed by the one or more processors individually or collectively, may cause the electronic device to identify at least one touch input for the visual object comprised in the visual affordance, as the first user input.

According to an embodiment, the one or more computer programs may include computer-executable instructions that, when executed by the one or more processors individually or collectively, may cause the electronic device to receive an input for ceasing the display of the preview image while the preview image is displayed through the second display, based on the input, display a home screen through the second display, while the home screen is displayed through the second display, receive the first user input, and in response to the first user input, display the home screen through the first display among the first display and the second display.

According to an embodiment, the electronic device may comprise a second camera disposed to face a direction toward which the first display faces. The one or more computer programs may include computer-executable instructions that, when executed by the one or more processors individually or collectively, may cause the electronic device to. while displaying the preview image through the second display in the unfolding state, identify that a posture of the electronic device is changed from a first posture in which the first camera faces a user of the electronic device to a second posture in which the second camera faces the user, and based on identifying that the posture of the electronic device is changed from the first posture to the second posture, display the preview image thought the first display among the first display and the second display.

According to an embodiment, the one or more computer programs may include computer-executable instructions that, when executed by the one or more processors individually or collectively, may cause the electronic device to identify an object related to a part of a body of the user in the preview image displayed in the unfolding state, and based on identifying that the part of the body of the user is out of a focus of the first camera, identify, using a gyroscope sensor comprised in the at least one sensor, that the posture of the electronic device is changed from the first posture in which the first camera faces the user of the electronic device to the second posture in which the second camera faces the user.

According to an embodiment, the electronic device may comprise the second camera disposed to face a direction which the first display faces. The one or more computer programs may include computer-executable instructions that, when executed by the one or more processors individually or collectively, may cause the electronic device to identify a first object related to a part of a body of a user of the electronic device in the preview image displayed through the second display in the unfolding state, after identifying the first object related to the part of the body of the user, identify that a posture of the electronic device is changed from a first posture in which the first camera faces the user of the electronic device to a second posture in which the second camera faces the user, and based on identifying a second object related to the part of the body of the user in an image obtained using the second camera, display the preview image through the first display among the first display and the second display.

According to an embodiment, the electronic device may comprise the second camera disposed to face a direction toward which the first display faces. The one or more computer programs may include computer-executable instructions that, when executed by the one or more processors individually or collectively, may cause the electronic device to display, through the second display among the first display and the second display, the preview image and an executable object used for maintaining a display for displaying the preview image as the first display, in a folding state in which the first direction is opposite to the second direction, receive a second user input for the executable object displayed through the second display, after receiving the second user input for the executable object, identify that a state of the electronic device is changed from the folding state to the unfolding state, and display the preview image through the second display among the first display and the second display, in the unfolding state.

According to an embodiment, the one or more computer programs may include computer-executable instructions that, when executed by the one or more processors individually or collectively, may cause the electronic device to, in response to the second user input, maintain a display for providing a main screen as the second display, and in response to the second user input, maintain a display for providing an auxiliary screen as the first display.

According to an embodiment, the one or more computer programs may include computer-executable instructions that, when executed by the one or more processors individually or collectively, may cause the electronic device to, in response to the first user input, switch the display for providing the main screen from the second display to the first display, and in response to the first user input, switch the display for providing the auxiliary screen from the first display to the second display.

According to an embodiment, the one or more computer programs may include computer-executable instructions that, when executed by the one or more processors individually or collectively, may cause the electronic device to, while the preview image and the executable object are displayed through the second display in the folding state, identify that the state of the electronic device is changed from the folding state to the unfolding state, and display the preview image through the first display among the first display and the second display, in the unfolding state.

According to an embodiment, the preview image displayed though the second display, may be included in a first user interface set in the third display area. The preview image displayed through the first display, may be included in a second user interface set in the first display area and the second display area.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," or "connected with" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between a case in which data is semi-permanently stored in the storage medium and a case in which the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

It will be appreciated that various embodiments of the disclosure according to the claims and description in the specification can be realized in the form of hardware, software or a combination of hardware and software.

Any such software may be stored in non-transitory computer readable storage media. The non-transitory computer readable storage media store one or more computer programs (software modules), the one or more computer programs include computer-executable instructions that, when executed by one or more processors of an electronic device individually or collectively, cause the electronic device to perform a method of the disclosure.

Any such software may be stored in the form of volatile or non-volatile storage such as, for example, a storage device like read only memory (ROM), whether erasable or rewritable or not, or in the form of memory such as, for example, random access memory (RAM), memory chips, device or integrated circuits or on an optically or magnetically readable medium such as, for example, a compact disk (CD), digital versatile disc (DVD), magnetic disk or magnetic tape or the like. It will be appreciated that the storage devices and storage media are various embodiments of non-transitory machine-readable storage that are suitable for storing a computer program or computer programs comprising instructions that, when executed, implement various embodiments of the disclosure. Accordingly, various embodiments provide a program comprising code for implementing apparatus or a method as claimed in any one of the claims of this specification and a non-transitory machine-readable storage storing such a program.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:

a first housing;

a second housing;

a hinge structure rotatably connecting the first housing to the second housing based on a folding axis;

a first display, which is foldable, comprising a first display area corresponding to a first surface of the first housing and a second display area corresponding to a first surface of the second housing, wherein the first display area and the second display area are divided based on the folding axis according to the hinge structure;

a second display in the first housing, the second display comprising a third display area facing a direction opposite to the first display area;

a first camera disposed on a second surface of the second housing opposite to the first surface of the second housing;

at least one sensor;

memory including one or more storage media, storing one or more computer programs; and one or more processors including processing circuitry, wherein the one or more computer programs include computer-executable instructions that, when executed by the one or more processors individually or collectively, cause the electronic device to:

display, through the second display, a preview image obtained using the first camera in an unfolding state in which a first direction toward which the first display area faces corresponds to a second direction toward which the second display area faces, the preview image not being displayed through the first display while displaying the preview image through the second display, receive a first user input while the preview image is displayed through the second display and is not displayed through the first display, and in response to the first user input, display the preview image through the first display.

2. The electronic device of claim 1, wherein the one or more computer programs further include computer-executable instructions that, when executed by the one or more processors individually or collectively, cause the electronic device to:

display a visual affordance for receiving the first user input through the first display while the preview image is displayed through the second display; and in response to receiving the first user input according to the visual affordance, display the preview image through the first display among the first display and the second display.

3. The electronic device of claim 2, wherein the visual affordance comprises:

information indicating that the preview image is displayed on the second display; and a visual object for receiving the first user input.

4. The electronic device of claim 3, wherein the one or more computer programs further include computer-executable instructions that, when executed by the one or more processors individually or collectively, cause the electronic device to:

in response to the first user input, cease the displaying of the preview image through the second display and the displaying of the visual affordance through the first display.

5. The electronic device of claim 3, wherein the one or more computer programs further include computer-executable instructions that, when executed by the one or more processors individually or collectively, cause the electronic device to:

identify at least one touch input for the visual object, as the first user input.

6. The electronic device of claim 1, wherein the one or more computer programs further include computer-executable instructions that, when executed by the one or more processors individually or collectively, cause the electronic device to:

receive an input for ceasing the displaying of the preview image while the preview image is displayed through the second display;

based on the input, display a home screen through the second display;

while the home screen is displayed through the second display, receive the first user input; and in response to the first user input, display the home screen through the first display.

7. The electronic device of claim 1, further comprising:

a second camera facing a direction toward which the first display faces, wherein the one or more computer programs further include computer-executable instructions that, when executed by the one or more processors individually or collectively, cause the electronic device to:

while displaying the preview image through the second display in the unfolding state, identify that a posture of the electronic device is changed from a first posture in which the first camera faces a user of the electronic device to a second posture in which the second camera faces the user, and based on identifying that the posture of the electronic device changed from the first posture to the second posture, display the preview image through the first display.

8. The electronic device of claim 7, wherein the one or more computer programs further include computer-executable instructions that, when executed by the one or more processors individually or collectively, cause the electronic device to:

identify an object related to a part of a body of the user in the preview image displayed in the unfolding state; and based on identifying that the part of the body of the user is out of a focus of the first camera, identify, using a gyroscope sensor comprised in the at least one sensor, that the posture of the electronic device has changed from the first posture in which the first camera faces the user of the electronic device to the second posture in which the second camera faces the user.

9. The electronic device of claim 7, wherein the one or more computer programs further include computer-executable instructions that, when executed by the one or more processors individually or collectively, cause the electronic device to:

identify a first object related to a part of a body of a user of the electronic device in the preview image displayed through the second display in the unfolding state;

after identifying the first object related to the part of the body of the user, identify that a posture of the electronic device has changed from a first posture in which the first camera faces the user of the electronic device to a second posture in which the second camera faces the user; and based on identifying a second object related to the part of the body of the user in an image obtained using the second camera, display the preview image through the first display.

10. The electronic device of claim 7, wherein the one or more computer programs further include computer-executable instructions that, when executed by the one or more processors individually or collectively, cause the electronic device to:

display, through the second display, the preview image and an executable object used for maintaining a display for displaying the preview image as the first display, in a folding state in which the first direction is opposite to the second direction;

receive a second user input for the executable object displayed through the second display;

after receiving the second user input for the executable object, identify that a state of the electronic device changed from the folding state to the unfolding state; and display the preview image through the second display, in the unfolding state.

11. The electronic device of claim 10, wherein the one or more computer programs further include computer-executable instructions that, when executed by the one or more processors individually or collectively, cause the electronic device to:

in response to the second user input, maintain a display for providing a main screen as the second display; and in response to the second user input, maintain a display for providing an auxiliary screen as the first display.

12. The electronic device of claim 11, wherein the one or more computer programs further include computer-executable instructions that, when executed by the one or more processors individually or collectively, cause the electronic device to:

in response to the first user input, switch the display for providing the main screen from the second display to the first display; and in response to the first user input, switch the display for providing the auxiliary screen from the first display to the second display.

13. The electronic device of claim 10, wherein the one or more computer programs further include computer-executable instructions that, when executed by the one or more processors individually or collectively, cause the electronic device to:

while the preview image and the executable object are displayed through the second display in the folding state, identify that the state of the electronic device changed from the folding state to the unfolding state; and display the preview image through the first display, in the unfolding state.

14. The electronic device of claim 13, wherein the preview image displayed though the second display, is included in a first user interface set in the third display area, and wherein the preview image displayed through the first display, is included in a second user interface set in the first display area and the second display area.

15. A method of an electronic device comprising a first housing, a second housing, a camera, a flexible first display disposed on a first surface of the first housing and a first surface of the second housing, and a second display disposed on a second surface of the first housing opposite to the first surface of the first housing, the method comprising:

in an unfolding state in which a first direction toward which a first display area of the first display faces corresponds to a second direction toward which a second display area of the first display faces, displaying, through the second display, a preview image obtained using the camera, the preview image not being displayed through the first display while displaying the preview image through the second display;

receiving a first user input while the preview image is displayed through the second display and is not displayed through the first display; and in response to the first user input, displaying the preview image through the first display.

16. The method of the electronic device of claim 15, further comprising:

displaying a visual affordance for receiving the first user input through the first display while the preview image is displayed through the second display; and in response to receiving the first user input according to the visual affordance, displaying the preview image through the first display among the first display and the second display.

17. The method of the electronic device of claim 16, wherein the visual affordance comprises:

information indicating that the preview image is displayed on the second display; and a visual object for receiving the first user input.

18. The method of the electronic device of claim 17, further comprising:

in response to the first user input, ceasing the displaying of the preview image through the second display and the displaying of the visual affordance through the first display.

19. One or more non-transitory computer-readable storage media storing one or more computer programs including computer-executable instructions that, when executed by one or more processors of an electronic device individually or collectively, the electronic device comprising a first housing, a second housing, a camera, a flexible first display disposed on a first surface of the first housing and a first surface of the second housing, and a second display disposed on a second surface of the first housing opposite to the first surface of the first housing, cause the electronic device to perform operations, the operations comprising:

in an unfolding state in which a first direction toward which a first display area of the first display faces corresponds to a second direction toward which a second display area of the first display faces, displaying, through the second display, a preview image obtained using the camera, the preview image not being displayed through the first display while displaying the preview image through the second display;

receiving a first user input while the preview image is displayed through the second display and is not displayed through the first display; and in response to the first user input, displaying the preview image through the first display.

20. The one or more non-transitory computer-readable storage media of claim 19, the operations further comprising:

displaying a visual affordance for receiving the first user input through the first display while the preview image is displayed through the second display; and in response to receiving the first user input according to the visual affordance, displaying the preview image through the first display among the first display and the second display.

* * * * *